United States Patent

Oshima

(10) Patent No.: US 9,348,443 B2
(45) Date of Patent: May 24, 2016

(54) INFORMATION PROCESSING APPARATUS, METHOD OF CONTROLLING THE SAME, PROGRAM AND STORAGE MEDIUM

(71) Applicant: CANON KABUSHIKI KAISHA, Tokyo (JP)

(72) Inventor: Soshi Oshima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 14/009,091

(22) PCT Filed: Aug. 1, 2013

(86) PCT No.: PCT/JP2013/071440
§ 371 (c)(1),
(2) Date: Sep. 30, 2013

(87) PCT Pub. No.: WO2014/024948
PCT Pub. Date: Feb. 13, 2014

(65) Prior Publication Data
US 2014/0062928 A1      Mar. 6, 2014

(30) Foreign Application Priority Data
Aug. 10, 2012 (JP) ................. 2012-178922

(51) Int. Cl.
G06F 3/041 (2006.01)
G06F 3/0483 (2013.01)
G06F 3/0488 (2013.01)
G06F 3/0484 (2013.01)

(52) U.S. Cl.
CPC .............. *G06F 3/041* (2013.01); *G06F 3/0483* (2013.01); *G06F 3/04847* (2013.01); *G06F 3/04883* (2013.01); *G06F 2203/04808* (2013.01)

(58) Field of Classification Search
CPC ..... G06F 3/041; G06F 3/0416; G06F 3/0482; G06F 3/0483; G06F 3/04883; G06F 3/04886; G06F 2203/04803; G06F 2203/04808; G06F 2203/04104
See application file for complete search history.

(56) References Cited

U.S. PATENT DOCUMENTS

| 2007/0047020 A1* | 3/2007 | Kim ........................ 358/450 |
| 2007/0177803 A1* | 8/2007 | Elias et al. ................ 382/188 |
| 2008/0198415 A1* | 8/2008 | Hattori ..................... 358/1.17 |
| 2009/0307589 A1  | 12/2009 | Inose et al. |
| 2010/0088641 A1* | 4/2010 | Choi ........................ 715/828 |
| 2012/0154313 A1* | 6/2012 | Au et al. ................... 345/173 |
| 2013/0176232 A1* | 7/2013 | Waeller .................... 345/173 |

FOREIGN PATENT DOCUMENTS

JP   2009-294857 A   12/2009
WO   2010/041826 A2   4/2010

OTHER PUBLICATIONS

Int'l Search Report dated Nov. 12, 2013 for PCT/JP2013/071440 filed on Int'l Filing Date Aug. 1, 2013 by Canon Kabushiki Kaisha.

* cited by examiner

*Primary Examiner* — Quan-Zhen Wang
*Assistant Examiner* — Dong Hui Liang
(74) *Attorney, Agent, or Firm* — Fitzpatrick, Cella, Harper & Scinto

(57) ABSTRACT

Provided are an information processing apparatus provided with a display unit including a touch panel, and a method for controlling the same. The information processing apparatus detects a plurality of touch points on a display object displayed on the display unit, and, if the number of the detected plurality of touch points is a predetermined number or more, divides this display object into a plurality of display objects in response to at least some of the plurality of touch points moving in an opposite direction on the touch panel to other of the plurality of touch points.

16 Claims, 30 Drawing Sheets

| TOUCH INFORMATION NUMBER | | | 1 | | | | | |
|---|---|---|---|---|---|---|---|---|
| TIME OF TOUCH INPUT | | | 1"00 | | | | | |
| NUMBER OF TOUCH POINTS | | | 1 | | | | | |
| TOUCH POINT COORDINATE INFORMATION | X-COORDINATE | Y-COORDINATE | TOUCH TIME | RELEASE TIME | MOVING FLAG | SINGLE TAP FLAG | DOUBLE TAP FLAG | LONG TAP FLAG |
| TOUCH POINT 1 | 306 | 221 | 1"00 | — | FALSE | FALSE | FALSE | FALSE |

| TOUCH INFORMATION NUMBER | | | 2 | | | | | |
|---|---|---|---|---|---|---|---|---|
| TIME OF TOUCH INPUT | | | 1"21 | | | | | |
| NUMBER OF TOUCH POINTS | | | 2 | | | | | |
| TOUCH POINT COORDINATE INFORMATION | X-COORDINATE | Y-COORDINATE | TOUCH TIME | RELEASE TIME | MOVING FLAG | SINGLE TAP FLAG | DOUBLE TAP FLAG | LONG TAP FLAG |
| TOUCH POINT 1 | 306 | 221 | 1"00 | — | FALSE | FALSE | FALSE | FALSE |
| TOUCH POINT 2 | 440 | 291 | 1"21 | — | FALSE | FALSE | FALSE | FALSE |

| TOUCH INFORMATION NUMBER | | | 3 | | | | |
|---|---|---|---|---|---|---|---|
| TIME OF TOUCH INPUT | | | 3"00 | | | | |
| NUMBER OF TOUCH POINTS | | | 2 | | | | |
| TOUCH POINT COORDINATE INFORMATION | X-COORDINATE | Y-COORDINATE | TOUCH TIME | RELEASE TIME | MOVING FLAG | SINGLE TAP FLAG | DOUBLE TAP FLAG | LONG TAP FLAG |
| TOUCH POINT 1 | 310 | 219 | 1"00 | - | TRUE | FALSE | FALSE | FALSE |
| TOUCH POINT 2 | 435 | 295 | 1"21 | - | TRUE | FALSE | FALSE | FALSE |

| TOUCH INFORMATION NUMBER | | | 4 | | | | |
|---|---|---|---|---|---|---|---|
| TIME OF TOUCH INPUT | | | 3"050 | | | | |
| NUMBER OF TOUCH POINTS | | | 2 | | | | |
| TOUCH POINT COORDINATE INFORMATION | X-COORDINATE | Y-COORDINATE | TOUCH TIME | RELEASE TIME | MOVING FLAG | SINGLE TAP FLAG | DOUBLE TAP FLAG | LONG TAP FLAG |
| TOUCH POINT 1 | 310 | 219 | 1"00 | - | FALSE | FALSE | FALSE | FALSE |
| TOUCH POINT 2 | 435 | 295 | 1"21 | - | FALSE | FALSE | FALSE | FALSE |

FIG. 3E

| P5 | | | | | | | | | |
|---|---|---|---|---|---|---|---|---|---|
| TOUCH INFORMATION NUMBER | | | | | | 5 | | | |
| TIME OF TOUCH INPUT | | | | | | 5"21 | | | |
| NUMBER OF TOUCH POINTS | | | | | | 3 | | | |
| TOUCH POINT COORDINATE INFORMATION | | X-COORDINATE | Y-COORDINATE | TOUCH TIME | RELEASE TIME | MOVING FLAG | SINGLE TAP FLAG | DOUBLE TAP FLAG | LONG TAP FLAG |
| | TOUCH POINT 1 | 310 | 219 | 1"00 | --- | FALSE | FALSE | FALSE | FALSE |
| | TOUCH POINT 2 | 435 | 295 | 1"21 | --- | FALSE | FALSE | FALSE | FALSE |
| | TOUCH POINT 3 | 555 | 308 | 5"21 | --- | FALSE | FALSE | FALSE | FALSE |

F I G. 3F

| P6 | | | | | | | | | | |
|---|---|---|---|---|---|---|---|---|---|---|
| TOUCH INFORMATION NUMBER | | | | | | 6 | | | | |
| TIME OF TOUCH INPUT | | | | | | 7"00 | | | | |
| NUMBER OF TOUCH POINTS | | | | | | 2 | | | | |
| TOUCH POINT COORDINATE INFORMATION | | X-COORDINATE | Y-COORDINATE | TOUCH TIME | RELEASE TIME | MOVING FLAG | SINGLE TAP FLAG | DOUBLE TAP FLAG | LONG TAP FLAG |
| | TOUCH POINT 1 | 310 | 219 | 1"00 | -- | FALSE | FALSE | FALSE | FALSE |
| | TOUCH POINT 2 | 435 | 295 | 1"21 | 7"00 | FALSE | FALSE | FALSE | TRUE |
| | TOUCH POINT 3 | 555 | 308 | 5"21 | -- | FALSE | FALSE | FALSE | FALSE |

F I G. 3G

| P7 | | | | | | | | | |
|---|---|---|---|---|---|---|---|---|---|
| TOUCH INFORMATION NUMBER | | 7 | | | | | | | |
| TIME OF TOUCH INPUT | | 7"00 | | | | | | | |
| NUMBER OF TOUCH POINTS | | 2 | | | | | | | |
| TOUCH POINT COORDINATE INFORMATION | | X-COORDINATE | Y-COORDINATE | TOUCH TIME | RELEASE TIME | MOVING FLAG | SINGLE TAP FLAG | DOUBLE TAP FLAG | LONG TAP FLAG |
| | TOUCH POINT 1 | 310 | 219 | 1"00 | - | FALSE | FALSE | FALSE | FALSE |
| | TOUCH POINT 3 | 555 | 308 | 5"21 | - | FALSE | FALSE | FALSE | FALSE |

FIG. 5A

| EVENT NAME | TOUCH EVENT |
|---|---|
| TRANSMITTED INFORMATION | COORDINATE VALUES OF TOUCH INPUT |
| | LATEST NUMBER OF TOUCH POINTS |

FIG. 5B

| EVENT NAME | SWIPE EVENT |
|---|---|
| TRANSMITTED INFORMATION | COORDINATE VALUES OF THE EVENT GENERATION |
| | MOVING DISTANCE |

FIG. 5C

| EVENT NAME | PINCH-IN EVENT |
|---|---|
| TRANSMITTED INFORMATION | COORDINATE VALUES OF THE CENTER OF PINCH-IN |
| | REDUCTION RATIO OF PINCH-IN |

FIG. 5D

| EVENT NAME | PINCH-OUT EVENT |
|---|---|
| TRANSMITTED INFORMATION | COORDINATE VALUES OF THE CENTER OF PINCH-OUT |
| | EXTENSION RATIO OF PINCH-OUT |

FIG. 5E

| EVENT NAME | TWO POINT SWIPE EVENT |
|---|---|
| TRANSMITTED INFORMATION | COORDINATE VALUES AT THE TIME OF EVENT GENERATION |
| | MOVING DISTANCE |

FIG. 5F

| EVENT NAME | ROTATION EVENT |
|---|---|
| TRANSMITTED INFORMATION | COORDINATE VALUES OF THE CENTER OF ROTATION |
| | ROTATION ANGLE |

FIG. 5G

| EVENT NAME | FLICK EVENT |
|---|---|
| TRANSMITTED INFORMATION | LATEST COORDINATE VALUES |
| | MOVING SPEED OF BEING RELEASED |

FIG. 5H

| EVENT NAME | TOUCH RELEASE EVENT |
|---|---|
| TRANSMITTED INFORMATION | RELEASED COORDINATE VALUES |
| | LATEST NUMBER OF TOUCH POINTS |

FIG. 5I

| EVENT NAME | DOUBLE TAP EVENT |
|---|---|
| TRANSMITTED INFORMATION | LATEST COORDINATE VALUES |

FIG. 5J

| EVENT NAME | SINGLE TAP EVENT |
|---|---|
| TRANSMITTED INFORMATION | LATEST COORDINATE VALUES |

FIG. 5K

| EVENT NAME | LONG TAP EVENT |
|---|---|
| TRANSMITTED INFORMATION | LATEST COORDINATE VALUES |

FIG. 5L

| EVENT NAME | TOUCH AND HOLD EVENT |
|---|---|
| TRANSMITTED INFORMATION | LATEST COORDINATE VALUES |

FIG. 5M

| EVENT NAME | MORE THAN THREE FINGER MOVE EVENT |
|---|---|
| TRANSMITTED INFORMATION | ALL OF LATEST COORDINATE VALUES |
| | LATEST COORDINATE VALUES OF THE CENTER OF GRAVITY |
| | ALL OF LAST COORDINATE VALUES |
| | LAST COORDINATE VALUES OF THE CENTER OF GRAVITY |
| | LATEST NUMBER OF TOUCH POINTS |

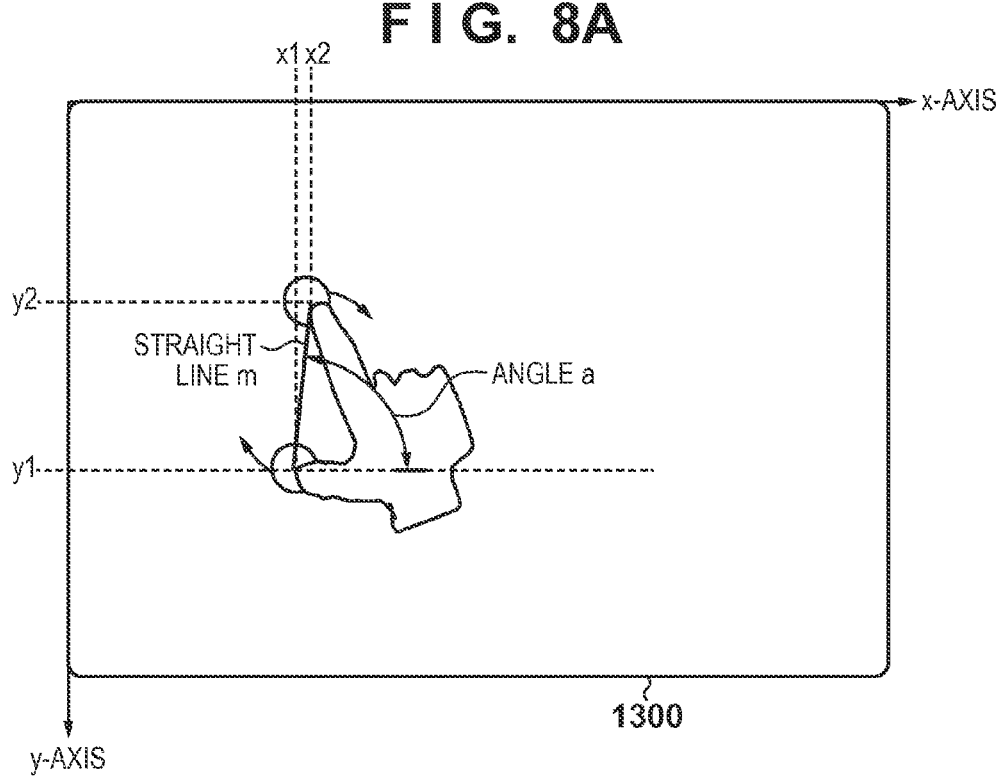
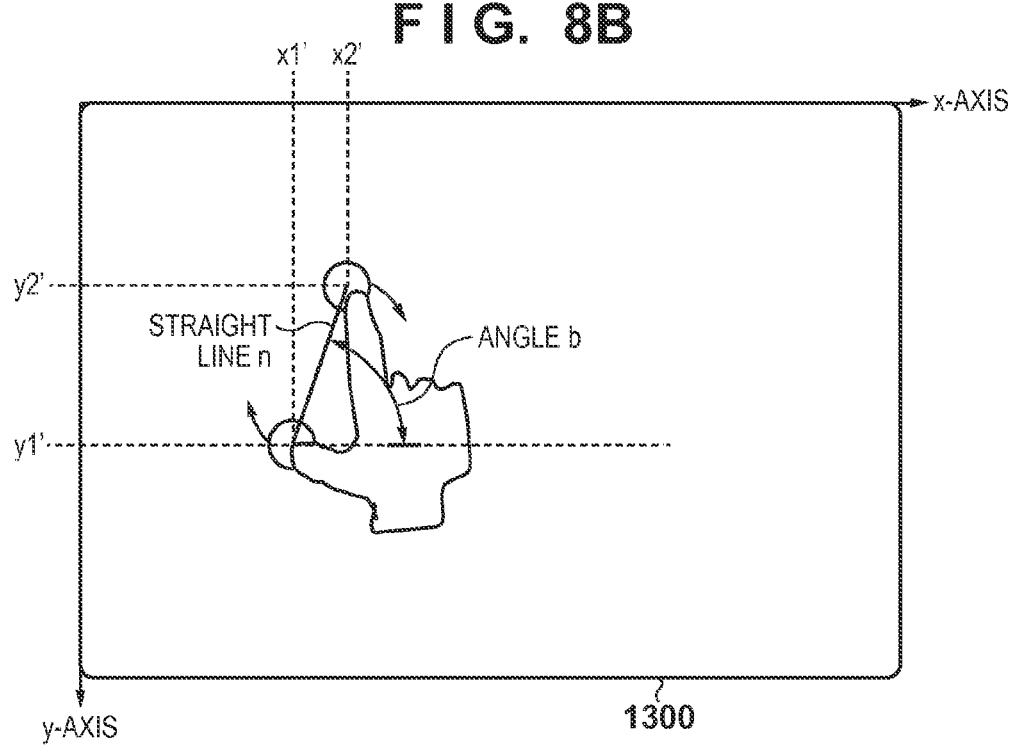

F I G. 15A
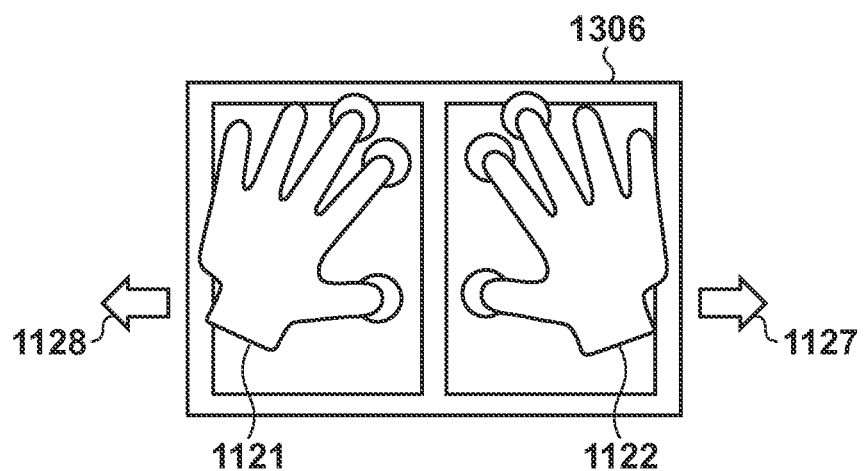
F I G. 15B
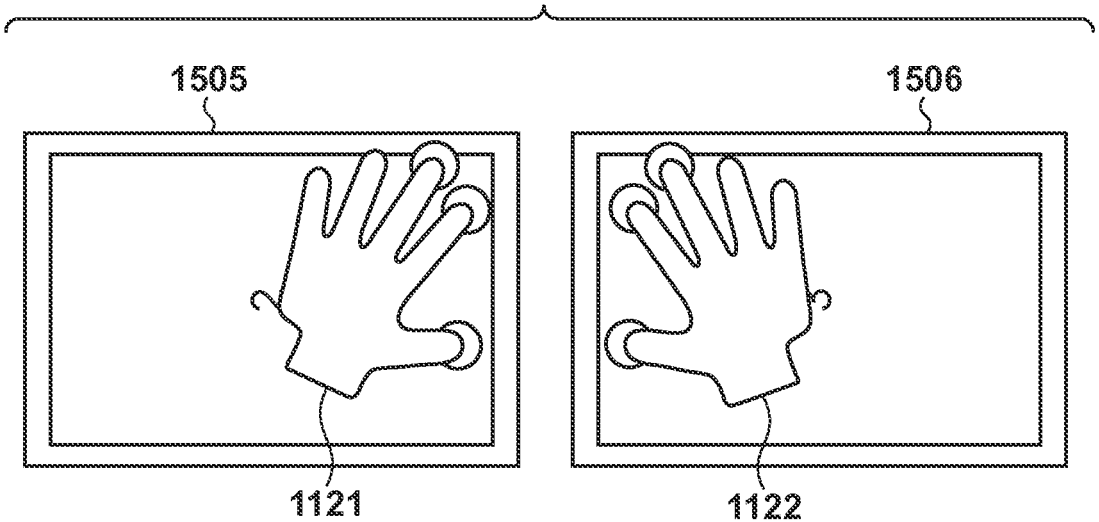

FIG. 16A
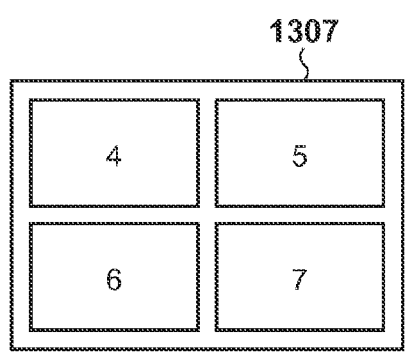
FIG. 16B
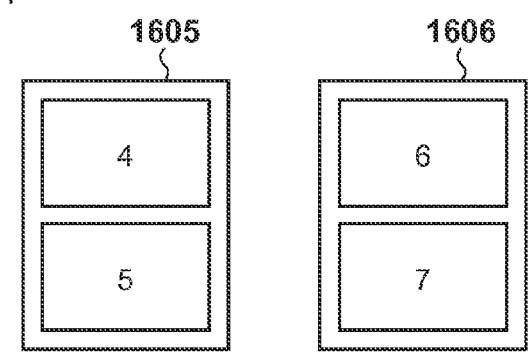
FIG. 16C
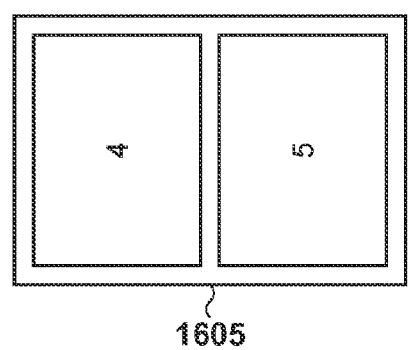 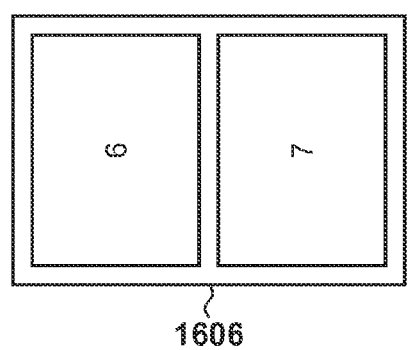

F I G. 19A

| DISPLAY OBJECT NUMBER | OBJECT NUMBER | AGGREGATION SETTING (HORIZONTAL, VERTICAL) | STORAGE ADDRESS | RECTANGULAR COORDINATES | SELECTION FLAG |
|---|---|---|---|---|---|
| 1 | 1 | (1, 1) | ADDR1 | $C_1$ | FALSE |
| 2 | 2 | (2, 1) | ADDR2 | $C_2$ | FALSE |
| 2 | 3 | (2, 1) | ADDR3 | $C_2$ | FALSE |
| 3 | 4 | (2, 2) | ADDR4 | $C_3$ | FALSE |
| 3 | 5 | (2, 2) | ADDR5 | $C_3$ | FALSE |
| 3 | 6 | (2, 2) | ADDR6 | $C_3$ | FALSE |
| 3 | 7 | (2, 2) | ADDR7 | $C_3$ | FALSE |
| 4 | 8 | (3, 2) | ADDR8 | $C_4$ | FALSE |
| 4 | 9 | (3, 2) | ADDR9 | $C_4$ | FALSE |
| 4 | 10 | (3, 2) | ADDR10 | $C_4$ | FALSE |
| 4 | 11 | (3, 2) | ADDR11 | $C_4$ | FALSE |
| 4 | 12 | (3, 2) | ADDR12 | $C_4$ | FALSE |
| 4 | 13 | (3, 2) | ADDR13 | $C_4$ | FALSE |
| ⋮ | | | | | |
| ENDOBJ | NULL | NULL | NULL | NULL | NULL |

FIG. 19B

| DISPLAY OBJECT NUMBER | OBJECT NUMBER | AGGREGATION SETTING (HORIZONTAL, VERTICAL) | STORAGE ADDRESS | RECTANGULAR COORDINATES | SELECTION FLAG |
|---|---|---|---|---|---|
| 1-1 | 1-1 | (1, 1) | ADDR1-1 | $C_{1\text{-}1}$ | FALSE |
| 1-2 | 1-2 | (1, 1) | ADDR1-2 | $C_{1\text{-}2}$ | FALSE |
| 2 | 2 | (2, 1) | ADDR2 | $C_2$ | FALSE |
| 2 | 3 | (2, 1) | ADDR3 | $C_2$ | FALSE |
| 3 | 4 | (2, 2) | ADDR4 | $C_3$ | FALSE |
| 3 | 5 | (2, 2) | ADDR5 | $C_3$ | FALSE |
| 3 | 6 | (2, 2) | ADDR6 | $C_3$ | FALSE |
| 3 | 7 | (2, 2) | ADDR7 | $C_3$ | FALSE |
| 4 | 8 | (3, 2) | ADDR8 | $C_4$ | FALSE |
| 4 | 9 | (3, 2) | ADDR9 | $C_4$ | FALSE |
| 4 | 10 | (3, 2) | ADDR10 | $C_4$ | FALSE |
| 4 | 11 | (3, 2) | ADDR11 | $C_4$ | FALSE |
| 4 | 12 | (3, 2) | ADDR12 | $C_4$ | FALSE |
| 4 | 13 | (3, 2) | ADDR13 | $C_4$ | FALSE |
| ⋮ | | | | | |
| ENDOBJ | NULL | NULL | NULL | NULL | NULL |

FIG. 19C

| DISPLAY OBJECT NUMBER | OBJECT NUMBER | AGGREGATION SETTING (HORIZONTAL, VERTICAL) | STORAGE ADDRESS | RECTANGULAR COORDINATES | SELECTION FLAG |
|---|---|---|---|---|---|
| 1 | 1 | (1, 1) | ADDR1 | $C_1$ | FALSE |
| 2-1 | 2 | (1, 1) | ADDR2 | $C_{2\text{-}1}$ | FALSE |
| 2-2 | 3 | (1, 1) | ADDR3 | $C_{2\text{-}2}$ | FALSE |
| 3 | 4 | (2, 2) | ADDR4 | $C_3$ | FALSE |
| 3 | 5 | (2, 2) | ADDR5 | $C_3$ | FALSE |
| 3 | 6 | (2, 2) | ADDR6 | $C_3$ | FALSE |
| 3 | 7 | (2, 2) | ADDR7 | $C_3$ | FALSE |
| 4 | 8 | (3, 2) | ADDR8 | $C_4$ | FALSE |
| 4 | 9 | (3, 2) | ADDR9 | $C_4$ | FALSE |
| 4 | 10 | (3, 2) | ADDR10 | $C_4$ | FALSE |
| 4 | 11 | (3, 2) | ADDR11 | $C_4$ | FALSE |
| 4 | 12 | (3, 2) | ADDR12 | $C_4$ | FALSE |
| 4 | 13 | (3, 2) | ADDR13 | $C_4$ | FALSE |
| ⋮ | | | | | |
| ENDOBJ | NULL | NULL | NULL | NULL | NULL |

FIG. 19D

| DISPLAY OBJECT NUMBER | OBJECT NUMBER | AGGREGATION SETTING (HORIZONTAL, VERTICAL) | STORAGE ADDRESS | RECTANGULAR COORDINATES | SELECTION FLAG |
|---|---|---|---|---|---|
| 1 | 1 | (1, 1) | ADDR1 | $C_1$ | FALSE |
| 2 | 2 | (2, 1) | ADDR2 | $C_2$ | FALSE |
| 2 | 3 | (2, 1) | ADDR3 | $C_2$ | FALSE |
| 3-1 | 4 | (2, 1) | ADDR4 | $C_{3-1}$ | FALSE |
| 3-1 | 5 | (2, 1) | ADDR5 | $C_{3-1}$ | FALSE |
| 3-2 | 6 | (2, 1) | ADDR6 | $C_{3-2}$ | FALSE |
| 3-2 | 7 | (2, 1) | ADDR7 | $C_{3-2}$ | FALSE |
| 4 | 8 | (3, 2) | ADDR8 | $C_4$ | FALSE |
| 4 | 9 | (3, 2) | ADDR9 | $C_4$ | FALSE |
| 4 | 10 | (3, 2) | ADDR10 | $C_4$ | FALSE |
| 4 | 11 | (3, 2) | ADDR11 | $C_4$ | FALSE |
| 4 | 12 | (3, 2) | ADDR12 | $C_4$ | FALSE |
| 4 | 13 | (3, 2) | ADDR13 | $C_4$ | FALSE |
| ⋮ | | | | | |
| ENDOBJ | NULL | NULL | NULL | NULL | NULL |

INFORMATION PROCESSING APPARATUS, METHOD OF CONTROLLING THE SAME, PROGRAM AND STORAGE MEDIUM

TECHNICAL FIELD

The present invention relates to an information processing apparatus that displays an object on a touch panel and can execute processing on the object through a touch operation of a user, a method of controlling the same, a program, and a storage medium.

BACKGROUND ART

When page objects (hereinafter referred to as "objects") of an electronic document or the like that is constituted by a plurality of pages are printed using a driver or the like, there is a technology for configuring a setting, such as 2-in-1 (printing of two pages on one sheet) or 4-in-1, for the entire document. Also, with respect to a document for which the aggregation setting such as 2-in-1 or 4-in-1 is configured, it is possible to return the setting to the initial state of, for example, 1-in-1.

However, operations to realize this have to be executed by, for example, a user selecting a menu while operating the driver, and are thus complicated.

In order to solve such a problem, Japanese Patent Laid-Open No. 2009-294857 proposes a technology for manipulating an object by operations of a user using a multi-touch UI that can recognize touching of a plurality of fingers. In the invention of this Japanese Patent Laid-Open No. 2009-294857, processing on objects is assigned to multi-touch gestures in which at least one finger is fixed on the object and another finger is moved.

However, in the conventional method, it is not taken into consideration to display a document for which an aggregation setting such as 2-in-1 or 4-in-1 is configured and to change the aggregation setting for the displayed document by an operation using the multi-touch UI.

SUMMARY OF INVENTION

An aspect of the present invention is to eliminate the above-mentioned problems which are found in the conventional technology.

A feature of the present invention is to provide a technique that divides a display object into two display objects by an operation of touching the display object with both hands and dividing the display object, and decides an object included in each divided display object.

According to an aspect of the present invention, there is provided an information processing apparatus provided with a display unit including a touch panel, the information processing apparatus comprising: detection means for detecting a plurality of touch points on a display object displayed on the display unit; and division means for dividing, if a number of the plurality of touch points detected by the detection means is a predetermined number or more, the display object into a plurality of display objects in response to at least some of the plurality of touch points moving in an opposite direction on the touch panel to other of the plurality of touch points.

According to an aspect of the present invention, there is provided a method for controlling an information processing apparatus provided with a display unit including a touch panel, the method comprising: a detection step of detecting a plurality of touch points on a display object displayed on the display unit; and a division step of dividing, if a number of the plurality of touch points detected in the detection step is a predetermined number or more, the display object into a plurality of display objects in response to at least some of the plurality of touch points moving in an opposite direction on the touch panel to other of the plurality of touch points.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 3A to 3G depict views illustrating examples of touch information generated through touch input by a user on a touch panel of the information processing apparatus according to the embodiment.

FIGS. 5A to 5M depict views illustrating a list of event names that are to be generated in flowcharts of FIGS. 6, 7, 9, 10A and 10B, and pieces of information that are to be transmitted to a gestural event processing section when the corresponding event has been generated.

FIGS. 8A and 8B depict views illustrating a situation in which the user performs a rotation operation on a touch panel in a clockwise direction.

FIGS. 15A and 15B depict views illustrating division of a display object 1306 in FIG. 13B into two display objects.

FIGS. 16A to 16C depict views illustrating division of a display object 1307 in FIG. 13B into display objects 1605 and 1606.

FIGS. 19A to 19D depict views illustrating examples of tables that associate display objects with objects and manage various types of information on the display objects.

DESCRIPTION OF EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
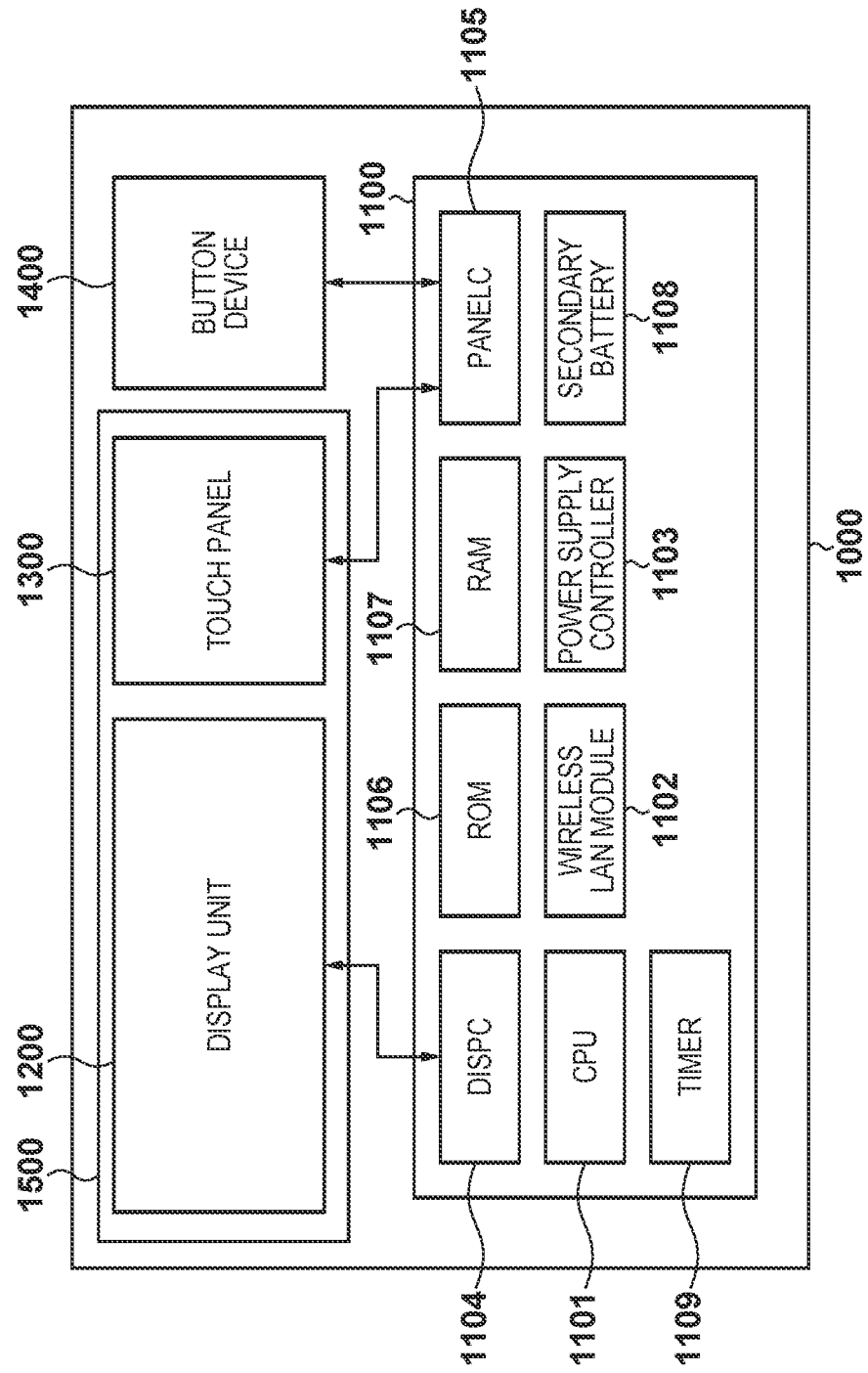
FIG. 1 is a block diagram illustrating a hardware configuration of an information processing apparatus according to an embodiment.

FIG. 1 is a block diagram illustrating a hardware configuration of an information processing apparatus 1000 according to the present embodiment.

The information processing apparatus 1000 is mainly provided with a main board 1100, a display unit 1200 such as a liquid crystal display unit, a touch panel 1300, and button devices 1400. Also, the display unit 1200 and the touch panel 1300 are collectively referred to as a touch UI 1500.

The main board 1100 includes a CPU 1101, a wireless LAN module 1102, a power supply controller 1103, a display controller (DISPC) 1104, and a panel controller (PANELC) 1105. The main board 1100 further includes a ROM 1106, a RAM 1107, a secondary battery 1108, and a timer 1109. These modules 1101 to 1109 are connected to each other via a bus (not shown).

The CPU 1101 controls the devices connected to the bus, and deploys and executes, in the RAM 1107, a software module (FIG. 2) according to the present embodiment stored in the ROM 1106. The RAM 1107 functions as a main memory and a work area of the CPU 1101, and as a storage area for image data to be displayed on the display unit 1200.

The display controller (DISPC) 1104 switches output of the image data deployed in the RAM 1107 at a high speed in accordance with a request of the CPU 1101, and outputs a synchronization signal to the display unit 1200. As a result, the image data stored in the RAM 1107 is output to the display unit 1200 in synchronization with the synchronization signal output by the DISPC 1104, and an image that corresponds to the image data is displayed on the display unit 1200.

The panel controller (PANELC) 1105 controls the touch panel 1300 and the button devices 1400 in accordance with a request of the CPU 1101. With this control, the CPU 1101 is notified of a touch point on the touch panel 1300 at which a finger or an instruction tool such as a stylus pen touches, a key code that corresponds to a touched key on the button devices 1400, or the like. The touch point information includes a coordinate value (hereinafter referred to as the "x-coordinate") that indicates an absolute position in the lateral direction of the touch panel 1300, and a coordinate value (hereinafter referred to as the "y-coordinate") that indicates an absolute position in the vertical direction. The touch panel 1300 is capable of detecting multiple simultaneous touch points, and in this case, the CPU 1101 is notified of pieces of touch point information equal in number to the number of touch points. Note that the touch panel 1300 may be any of various types of touch panel systems such as a resistive membrane system, a capacitance system, a surface acoustic wave system, an infrared ray system, an electromagnetic induction system, an image recognition system, or a light sensor system.

The power supply controller 1103 is connected to an external power supply (not shown) and supplied with power. Accordingly, the power supply controller 1103 supplies electric power to the entire information processing apparatus 1000 while charging the secondary battery 1108 connected to the power supply controller 1103. When no power is supplied from the external power supply, electric power from the secondary battery 1108 is supplied to the entire information processing apparatus 1000. The wireless LAN module 1102 establishes wireless communication with a wireless LAN module of another device in accordance with control of the CPU 1101, and mediates communication with the information processing apparatus 1000. An example of the wireless LAN module 1102 is an IEEE 802.11b wireless LAN module. The timer 1109 generates a timer interrupt to a gestural event generation section 2100 (FIG. 2) in accordance with control of the CPU 1101. The gestural event generation section 2100 will be described later with reference to FIG. 2.

Figure 2:
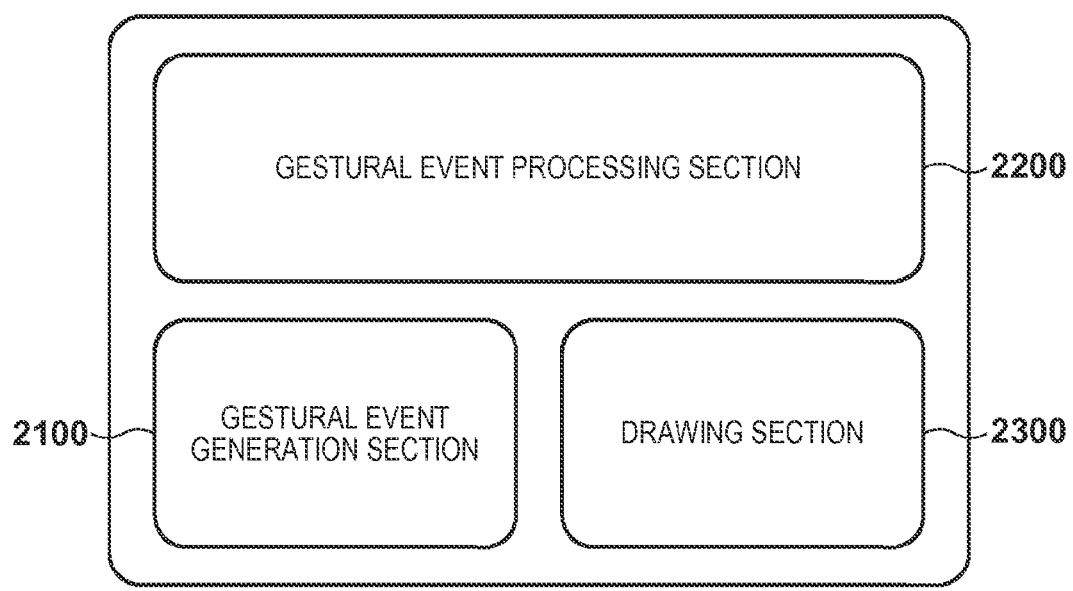
FIG. 2 is a block diagram illustrating a configuration of a software module executed by a CPU of the information processing apparatus according to the embodiment.

FIG. 2 is a block diagram illustrating a configuration of a software module executed by the CPU 1101 of the information processing apparatus 1000 according to the embodiment. Note that this software module is realized by the CPU 1101 deploying and executing, in the RAM 1107, a program stored in the ROM 1106.

Upon receipt of a touch input on the touch panel 1300 by a user, the gestural event generation section 2100 generates various types of gestural events shown in FIGS. 5A to 5M. The gestural event generation section 2100 transmits the generated gestural events to a gestural event processing section 2200. The gestural event processing section 2200 receives the gestural events generated in the gestural event generation section 2100, and executes processing that corresponds to each gestural event. A drawing section 2300 executes drawing processing on the display unit 1200 in accordance with the results of the processing executed by the gestural event processing section 2200.

The gestural event generation section 2100 will be described in detail later with reference to FIGS. 3A to 10.

FIGS. 3A to 3G are diagrams illustrating examples of touch information generated through touch input by a user on the touch panel 1300 of the information processing apparatus 1000 according to the embodiment. Although, here, finger touch input is taken as an example of the touch input by the user, the touch input may be input through a stylus pen or the like.

The touch information includes, as illustrated in FIG. 3A, touch information number, time of touch input, the number of touch points, and touch point coordinate information. Hereinafter, the constituent elements of the touch information will be described in detail.

Touch information number indicates the order in which the corresponding touch information is generated. The time of touch input indicates the time when touch input on the touch panel 1300 was performed by the user. The number of touch points indicates the number of sets of coordinates at which the user performs touch input. The touch point coordinate information indicates information relating to coordinates of a point at which the user performs touch input, and includes an x-coordinate, a y-coordinate, a touch time, a release time, a moving flag, a single tap flag, a double tap flag, and a long tap flag. The following will describe the constituent elements of this touch point coordinate information in detail.

The x-coordinate and the y-coordinate of the touch point coordinate information indicate coordinate values of one point on the touch panel 1300 at which a finger of the user touches. The touch time and the release time respectively indicate the time when this finger touches the touch panel 1300, and the time when this finger is released from the touch panel 1300. The moving flag indicates that the finger of the user is moving on the touch panel 1300. The single tap flag indicates that a single tap was made on the touch panel 1300 by the finger of the user. Here, "single tap" refers to an operation in which the finger of the user is released within a predetermined period of time after touching the touch panel 1300. The double tap flag indicates that a double tap was made on the touch panel 1300 by the finger of the user. Here, "double tap" refers to an operation in which a single tap is made in succession within a predetermined period of time. The long tap flag indicates that a long tap was made on the touch panel 1300 by the finger of the user. Here, "long tap" refers to an operation in which the finger of the user does not move while continuing to touch the touch panel for a predetermined period of time after touching the touch panel.

When the finger of the user touches the touch panel 1300, the touch point coordinate information obtains an entity that is, for example, a touch point 1 as shown in FIG. 3A. The touch point 1 has the values of the x-coordinate, the y-coordinate, the touch time, the release time, the moving flag, the single tap flag, the double tap flag, and the long tap flag in accordance with the constituent elements of the touch point coordinate information, as shown in FIG. 3A.

FIGS. 3A to 3G each illustrate an example of the touch information. FIGS. 3A to 3G are arranged in time series, and each indicate a piece of touch information of a certain point of time. Also, the pieces of touch information shown in FIGS. 3A to 3G are generated in order from FIG. 3A to FIG. 3G in accordance with the operation of the finger of the user. In FIGS. 3B to 3G, the shaded regions denote regions that have different touch information from that of the last touch information.

When touch information is generated, a pointer indicating the generated touch information is stored. Therefore, by referencing this pointer, it is possible to reference the values of latest touch information. Also, all pointers of touch information generated in the past are stored, and therefore it is possible to reference all values of the held touch information. For example, touch information immediately before the latest touch information can be referenced. However, a predetermined number of pieces of touch information are held as past history, and when the number of pieces of touch information has exceeded the predetermined number, the touch information is discarded from the oldest information. The discarded touch information cannot be referenced.

The examples of the touch information of FIGS. 3A to 3G will briefly be described. All the pieces of touch information are generated in step S601 in FIG. 6, step S701 in FIG. 7, step S901 in FIG. 9, or steps S1011 or S1013 in FIG. 10B.

Touch information P1 of FIG. 3A is generated when a finger of the user first touches the touch panel 1300, and is generated in later-described step S601. At this time, the touch point 1 indicates the values of touch point coordinate information of the finger of the user.

Touch information P2 of FIG. 3B is generated when the last touch information is the touch information P1 of FIG. 3A and a second finger of the user touches the touch panel 1300, and is generated in later-described step S601. At this time, a touch point 2 indicates the values of touch point coordinate information of the second finger.

Touch information P3 of FIG. 3C is generated when the last touch information is the touch information P2 of FIG. 3B and the two fingers of the user are moving on the touch panel 1300, and is generated in later-described step S701. At this time, moving flags of the touch points 1 and 2 show "TRUE", indicating that the two fingers are moving. In FIG. 3C, the x-coordinates and the y-coordinates change but the touch time does not change.

Touch information P4 of FIG. 3D is generated when the last touch information is the touch information P3 of FIG. 3C and the fingers of the user have stopped moving on the touch panel 1300, and is generated in later-described S1011. In FIG. 3D, since the fingers of the user have stopped moving, the x-coordinates and the y-coordinates are the same as those in FIG. 3C, and the moving flags of the touch points 1 and 2 show "FALSE", indicating that the fingers of the user have stopped moving.

Touch information P5 of FIG. 3E is generated when the last touch information is the touch information P4 of FIG. 3D and a third finger of the user touches the touch panel 1300, and is generated in later-described step S601. At this time, the touch points 1 and 2 are at the same coordinates as those in FIG. 3D, and the newly added touch point 3 indicates the values of touch point coordinate information of the third finger.

Touch information P6 of FIG. 3F is generated when the last touch information is the touch information P5 of FIG. 3E and the second finger of the user is released from the touch panel 1300, and is generated in later described step S901 in FIG. 9. The release time of the touch point 2 shows the time when the second finger is released. In FIG. 3F, the x-coordinates, the y-coordinates, and the touch times of the touch points 1 to 3 are not changed and the long tap flag of the touch point 2 is changed to "TRUE". This is because the second finger was touching the touch panel 1300 continuously for six seconds without moving.

Touch information P7 of FIG. 3G is generated by timer interrupt of the timer 1109 when the last touch information is the touch information P6 of FIG. 3F, and is generated in later-described step S1013 in FIG. 10B. It is clear that, at this time, the touch point 2 has been deleted. The processing for generating the above-described touch information will be described later with reference to flowcharts in FIGS. 6, 7, 9, and 10.

Figure 4:
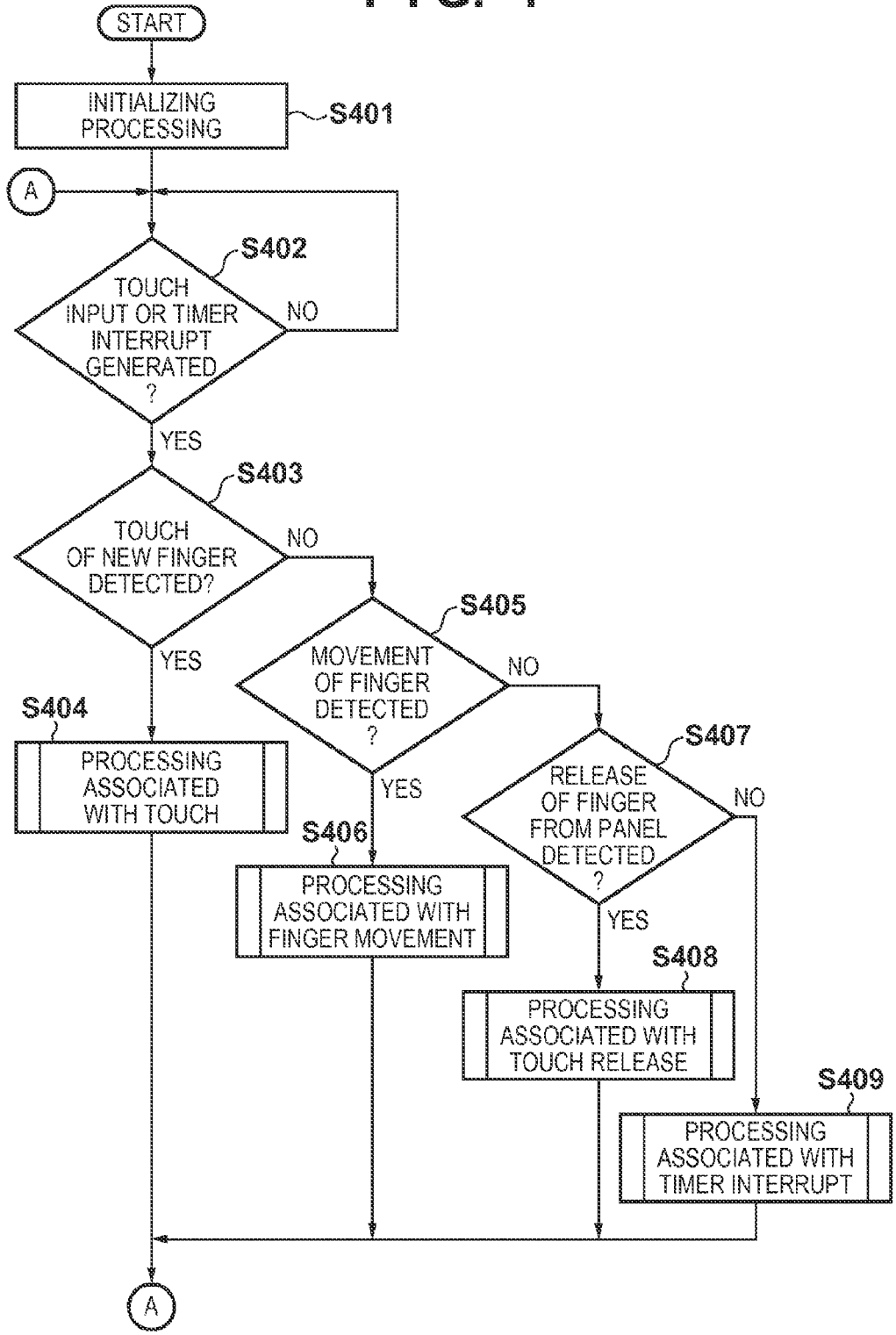
FIG. 4 is a flowchart for describing gestural event generation processing performed by the information processing apparatus.

FIG. 4 is a flowchart for describing gestural event generation processing performed by the information processing apparatus 1000 according to the embodiment. This flowchart shows processing from detection of touch input on the touch panel 1300 by the user until generation of event processing corresponding to each gesture operation of the user. This processing is executed by the gestural event generation section 2100 of the software module, and is described here as processing that is executed by the CPU 1101.

First, in step S401, the CPU 1101 initializes touch information P that shows the state of finger touch, as initializing processing. Next, the procedure advances to step S402, and the CPU 1101 checks whether or not touch input of the user or interrupt of the timer 1109 has occurred, and if touch input or interrupt has occurred, the procedure advances to step S403, and otherwise the procedure returns to step S402. In step S403, the CPU 1101 determines whether or not touch of a new finger of the user has been detected, and if touch of a new finger has been detected, the procedure advances to step S404, and otherwise the procedure shifts to step S405. In step S404, the CPU 1101 executes processing associated with the touch of a new finger of the user and the procedure returns to step S402. The details of step S404 will be described later with reference to the flowchart of FIG. 6.

In step S405, the CPU 1101 determines whether or not movement of the finger of the user that is touching the touch panel has been detected, and if movement has been detected, the procedure advances to step S406, and otherwise the procedure shifts to step S407. In step S406, the CPU 1101 executes processing associated with the movement of the finger of the user, and the procedure returns to step S402. The details of step S406 will be described later with reference to the flowchart in FIG. 7.

In step S407, the CPU 1101 determines whether or not release of the finger of the user from the touch panel 1300 has been detected, and if the finger has been released, the procedure advances to step S408, in which processing associated with touch release by the user is executed, and returns to step S402. The details of this step S408 will be described later with reference to the flowchart in FIG. 9. In contrast, in step S407, if release of the finger has not been detected, the procedure shifts to step S409. In step S409, the CPU 1101 executes processing that is performed when timer interrupt of the timer 1109 has occurred, and returns to step S402.

FIGS. 5A to 5M are diagrams illustrating a list of event names that are generated in the flowcharts of FIGS. 6, 7, 9, and 10, and pieces of information that are transmitted to the gestural event processing section 2200 from the gestural event generation section 2100 when a corresponding event is generated.

Figure 6:
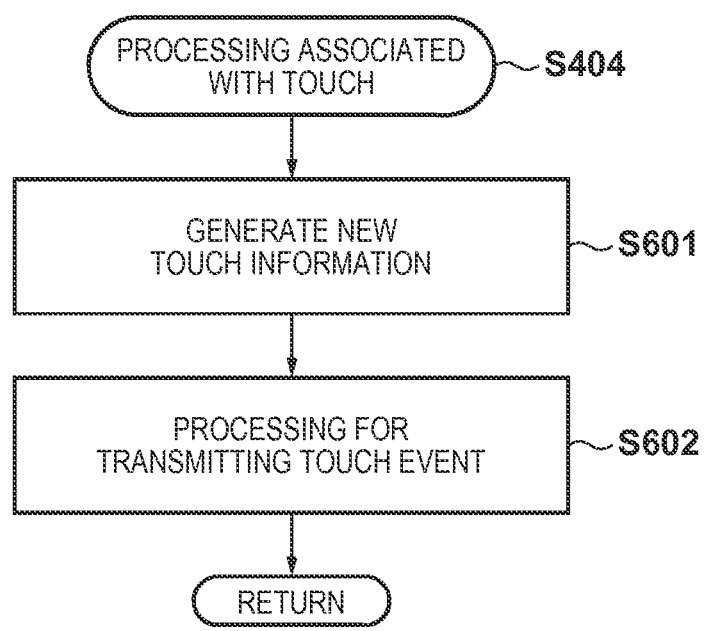
FIG. 6 is a flowchart for describing processing that is associated with touch of a new finger of the user in step S404 in FIG. 4.

FIG. 6 is a flowchart for describing processing that is associated with touch of a new finger of the user in step S404 in FIG. 4.

First, in step S601, the CPU 1101 generates new touch information if the last touch information does not exist. On the other hand, if the last touch information does exist, the CPU 1101 changes the touch information number, the time of touch input, and the number of touch points of this last touch information. Further, touch information incorporating a touch point of the finger that newly touched the touch panel is generated (see FIG. 3B).

Here, "last touch information" refers to touch information that was generated immediately before the touch information generated in step S601. Also, "latest touch information" refers to the touch information generated in step S601. For example, in FIG. 3A, since the last touch information does not exist, touch input of one point is detected, and the touch information P1 is newly generated. Also, when, with next touch input, touch input of a second point is detected in step S403, the touch information P2 of FIG. 3B is generated with reference to the touch information P1 of FIG. 3A. The shaded regions in FIG. 3B are regions that differ from those in FIG. 3A. Specifically, the touch information number is changed to "2", the time of touch input is changed to "1"21", the number of touch points is changed to "2", and "touch point 2" that corresponds to touch input of the second finger of the user is added. Further, when touch input of the third point (third finger) is detected, the touch information P5 of FIG. 3E is similarly generated with reference to the touch information P4 of FIG. 3D.

As described above, when the touch information has been generated, the procedure advances to step S602, and the CPU 1101 executes processing for transmitting a touch event. As illustrated in FIG. 5A, in the processing for transmitting a touch event, coordinate values of the touch input and the number of touch points which are the latest pieces of touch information are transmitted to the gestural event processing section 2200 and the processing associated with touch of the finger of the user ends.

Figure 7:
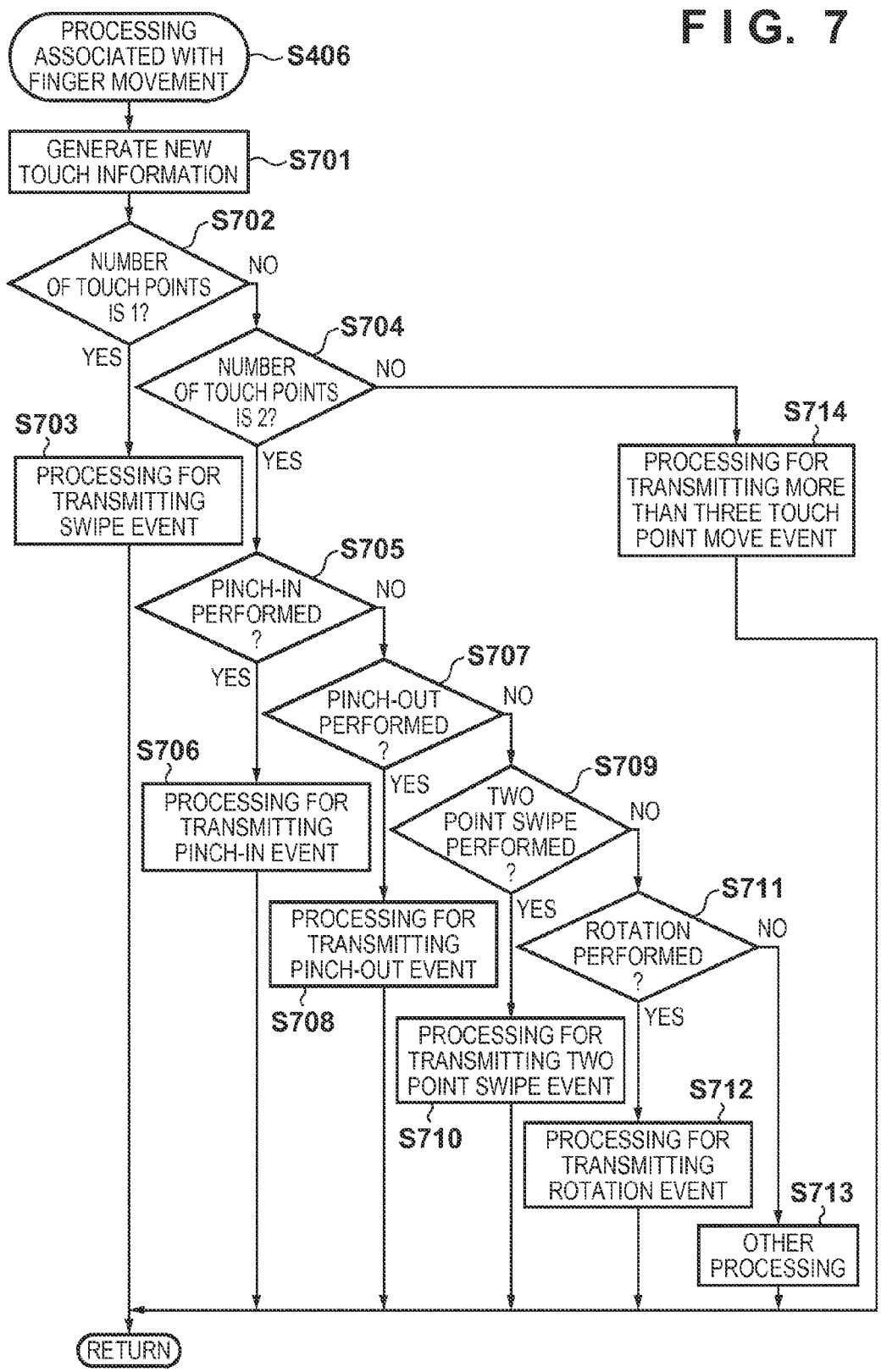
FIG. 7 is a flowchart for describing processing that is associated with movement of the finger of the user in step S406 in FIG. 4.

FIG. 7 is a flowchart for describing processing associated with movement of the finger of the user in step S406 in FIG. 4.

First, in step S701, the CPU 1101 changes the touch information number and the time of touch input of the last touch information, and generates touch information whose moving flag is "TRUE" (see FIG. 3C). In FIG. 7, "last touch information" refers to touch information that was generated immediately before the touch information generated in step S701. Also, "latest touch information" refers to the touch information generated in step S701.

For example, in FIG. 3C, if the last touch information is the touch information P2 of FIG. 3B, the touch information P3 of FIG. 3C is newly generated with reference to the touch information P2. Specifically, the touch information number is changed to "3", the time of touch input is changed to "3"00", the values of the x-coordinates and the y-coordinates of the touch points 1 and 2 are changed to the latest values, and the moving flag is changed to "TRUE".

Next, the procedure advances to step S702, the CPU 1101 determines whether or not the number of touch points of the latest touch information is "1", and if it is "1", the procedure advances to step S703, and otherwise the procedure shifts to step S704. In step S703, the CPU 1101 executes processing for transmitting a swipe event since one touch point is moving, and the procedure returns to the flowchart of FIG. 4. Here, "swipe" refers to an operation in which a fingertip moves (slides) in one direction while remaining in contact with the touch panel 1300. At this time, as illustrated in FIG. 5B, if a swipe event has been generated, the coordinate values of the latest touch information, and a moving distance obtained based on a difference in the coordinate values between the latest touch information and the last touch information are transmitted to the gestural event processing section 2200.

In step S704, the CPU 1101 determines whether or not the number of touch points of the latest touch information is "2". If so, the procedure advances to step S705, and otherwise the procedure advances to step S714. In step S705, the CPU 1101 determines whether or not the length of a straight line that connects the two touch points has reduced, and thereby determines whether or not pinch-in has been performed. If so, the procedure advances to step S706, and otherwise the procedure advances to step S707. In step S706, the CPU 1101 executes processing for transmitting a pinch-in event, and returns to the flowchart of FIG. 4. Here, "pinch-in" refers to an operation in which two fingertips move closer to each other (in a pinching manner) while remaining in contact with the touch panel 1300. Accordingly, if a pinch-in event has been generated, as illustrated in FIG. 5C, the coordinate values of the center of the two touch points, and a reduction ratio of pinch-in that is calculated from the reduced length of the straight line connecting the two touch points are transmitted to the gestural event processing section 2200.

In step S707, the CPU 1101 determines whether or not pinch-out has been performed by determining whether or not the length of the straight line connecting the two touch points has extended, and if so, the procedure advances to step S708, and otherwise the procedure advances to step S709. In step S708, processing for transmitting a pinch-out event is performed and the procedure returns to the flowchart of FIG. 4. Here, "pinch-out" refers to an operation in which two fingertips move away from each other (so that the fingers spread apart) while remaining in contact with the touch panel 1300. When the pinch-out event has been generated, as illustrated in FIG. 5D, the coordinate values of the center of the two touch points of the latest touch information and an extension ratio of pinch-out that is calculated from an extended length of the straight line connecting the two touch points are transmitted to the gestural event processing section 2200.

In step S709, the CPU 1101 determines whether or not a two point swipe has been performed by determining whether or not the two touch points are moving in the same direction, and if it is determined that a two point swipe has been performed, the procedure advances to step S710, and otherwise the procedure advances to step S711. In step S710, the CPU 1101 executes processing for transmitting a two point swipe event and returns to the flowchart of FIG. 4. If the two point swipe event has been generated, as illustrated in FIG. 5E, the coordinate values of the two touch points of the latest touch information, and a moving distance obtained based on a difference in the values of the two touch points between the latest and the last touch information are transmitted to the gestural event processing section 2200.

Next, in step S711, the CPU 1101 determines whether or not rotation has been performed on the basis of rotation of the two touch points, and if rotation has been performed, the procedure advances to step S712, and otherwise the procedure advances to step S713. In step S712, the CPU 1101 executes processing for transmitting a rotation event, and the procedure returns to the flowchart of FIG. 4. If the rotation event has been generated, coordinate values of the center of rotation that is calculated from the values of the two touch points of the latest touch information, and a rotation angle calculated from the values of the two touch points of the latest touch information and the last touch information are transmitted to the gestural event processing section 2200. This is indicated in FIG. 5F.

If it is determined that the operation did not fall under any of the above-described user operations, the CPU 1101 advances the procedure to step S713 to perform other processing, and returns to the flowchart of FIG. 4. The other processing may be processing in which nothing is performed.

Also, in step S704, if it is determined that the number of touch points of the latest touch information is not "2", the CPU 1101 advances the procedure to step S714 to perform processing for transmitting an event that is generated when three or more touch points have moved, and the procedure returns to the flowchart of FIG. 4. If, as shown in FIG. 5M, the three or more touch point move event has been generated, the following information is transmitted to the gestural event processing section 2200. This information includes all coordinate values of the latest touch information, the latest coordinate values of the centroid calculated from all the touch points, the number of the latest coordinates, all coordinate values of the last touch information, and the last coordinate values of the centroid. With these procedures, the processing associated with finger movement ends.

Now, the rotation event will be described in detail with reference to FIGS. 8A and 8B.

FIGS. 8A and 8B illustrate a situation in which the user performs a rotation operation on the touch panel 1300 in a clockwise direction. In FIG. 8A, the user is in touch with two points of (x1, y1) and (x2, y2) with his or her two fingers, the coordinate values of the center of the rotation are at the center of a straight line m that connects these two points, and an angle a is an angle obtained by a line parallel to the x-axis and the straight line m. On the other hand, in FIG. 8B, the user is in touch with two points of (x1', y1') and (x2', y2') with his or her two fingers, and the coordinate values of the center of rotation are at the center of a straight line n that connects these two points, and an angle b is an angle obtained by a line parallel to the x-axis and the straight line n. Assuming that FIG. 8B shows the touch points at the time of the transmission of the rotation event and FIG. 8A shows the last touch points thereof, the rotation angle is obtained by subtracting the angle b from the angle a.

Figure 9:
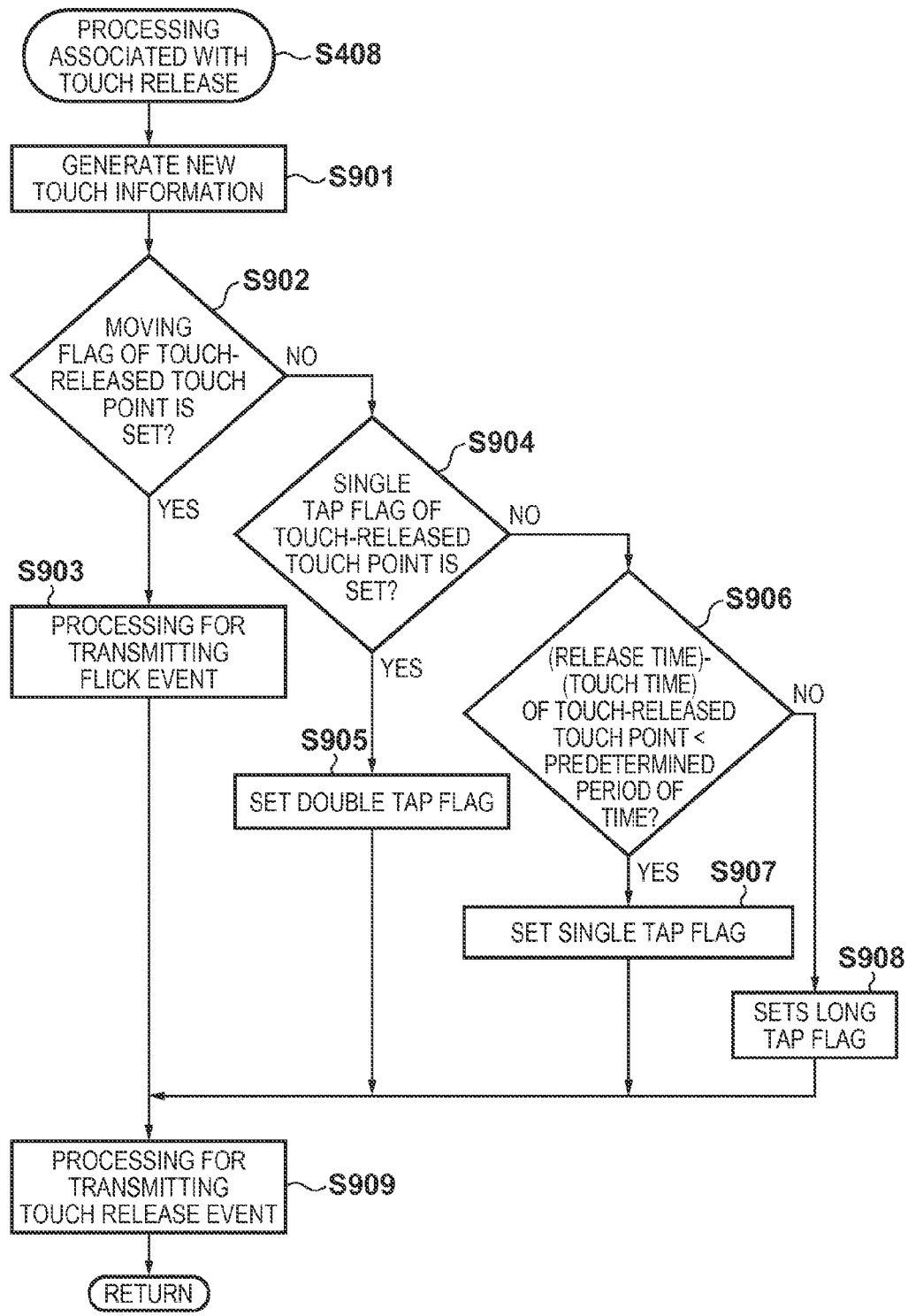
FIG. 9 is a flowchart for describing processing that is associated with touch release in step S408 in FIG. 4.

FIG. 9 is a flowchart for describing processing associated with the touch release in step S408 in FIG. 4.

First, in step S901, the CPU 1101 changes the touch information number, the time of touch input, and the number of touch points of the last touch information, and generates touch information in which a release time is set when touch has been released from the touch point. In FIG. 9, "last touch information" refers to touch information that was generated immediately before the touch information generated in step S901. Also, "latest touch information" refers to the touch information generated in step S901. For example, if the last touch information is the touch information P5 of FIG. 3E, the touch information P6 of FIG. 3F is newly generated with reference to the touch information P5. Specifically, the touch information number is changed to "6", the time of touch input is changed to "7"00", the number of touch points is changed to "2", and the release time of the coordinates 2 at which touch has been released is set to "7"00".

Next, the procedure advances to step S902, and the CPU 1101 determines whether or not the moving flag of the touch-released touch point in the latest touch information is "TRUE", and if so, the procedure advances to step S903 and otherwise the procedure advances to step S904. In step S903, the CPU 1101 recognizes that the finger has been released during the movement since the moving flag of the touch-released touch point is "TRUE", and executes processing for transmitting a flick event, and the procedure advances to step S909. Here, "flick" refers to an operation in which a finger is released (in a manner in which the finger is flicked) during a swipe. If a flick event has been generated, as illustrated in FIG. 5G, the coordinate values of the latest touch information and a moving speed of the finger calculated from the coordinate values of the latest touch information and the last touch information are transmitted to the gestural event processing section 2200.

In step S904, the CPU 1101 determines whether or not the single tap flag of the touch-released touch point is "TRUE", and if so, the procedure advances to step S905, and otherwise the procedure advances to step S906. In step S905, since a single tap has already been made on the touch-released touch point, the CPU 1101 sets a double tap flag for the touch-released touch point to on, and the procedure advances to step S909.

In step S906, the CPU 1101 determines whether or not "{(release time)–(touch time)}<predetermined period of time" for the touch-released touch point, and if so, the procedure advances to step S907, and otherwise the procedure advances to step S908. In step S907, since touch has been released within a predetermined period of time, the CPU 1101 sets the single tap flag for the touch-released touch point to on, and the procedure advances to step S909. On the other hand, in step S908, since touch has been released after the predetermined period of time has elapsed, the CPU 1101 sets the long tap flag for this touch-released touch point to on, and the procedure advances to step S909. In step S909, the CPU 1101 executes processing for transmitting a touch release event. If the touch release event has been generated, as illustrated in FIG. 5H, the coordinate values of the latest touch information and the number of coordinates are transmitted to the gestural event processing section 2200. With these procedures, the processing associated with the touch release ends.

Figure 10A:
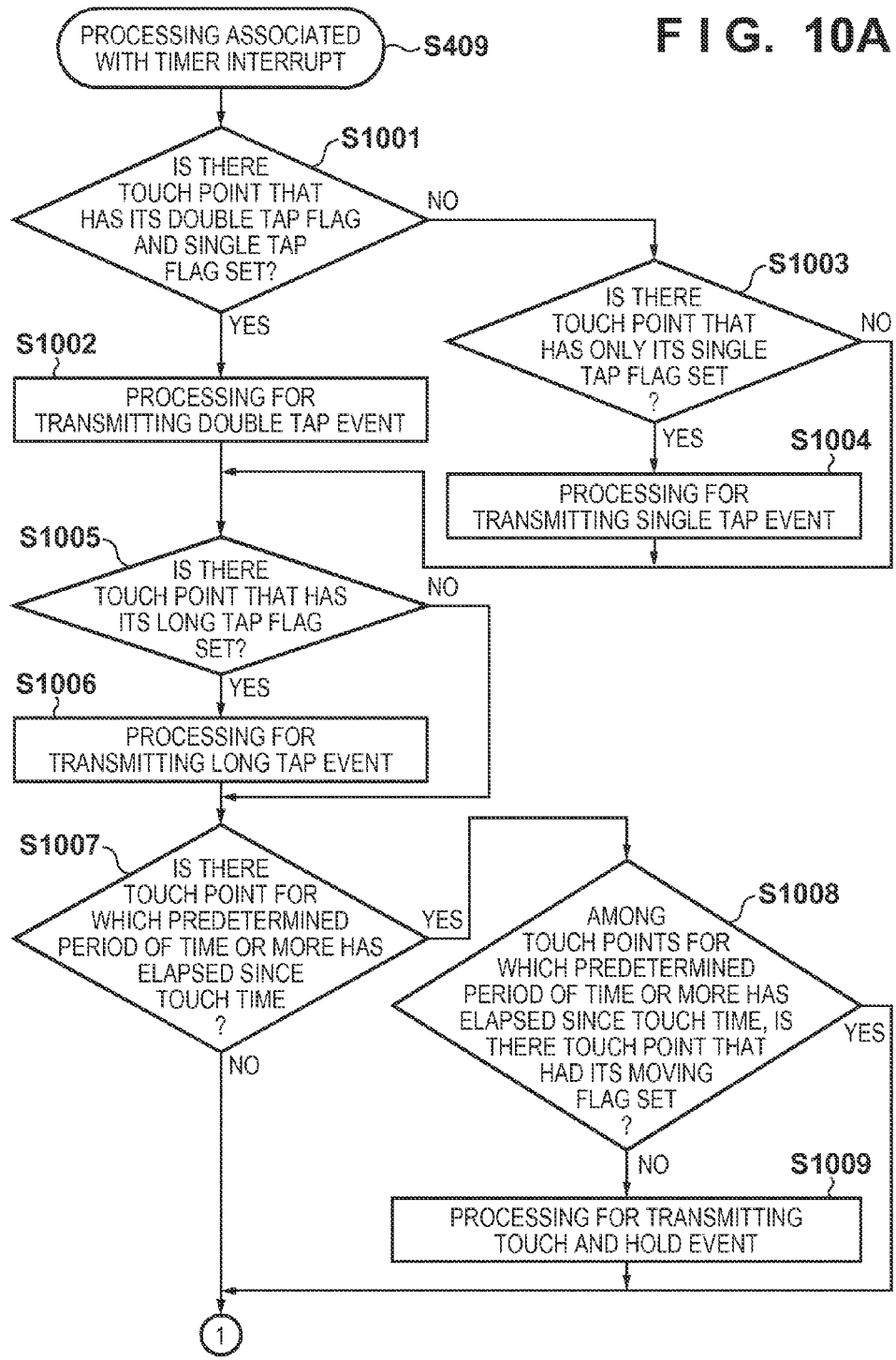
FIGS. 10A and 10B are flowcharts for describing processing that is associated with timer interrupt in step S409 in FIG. 4.
Figure 10B:
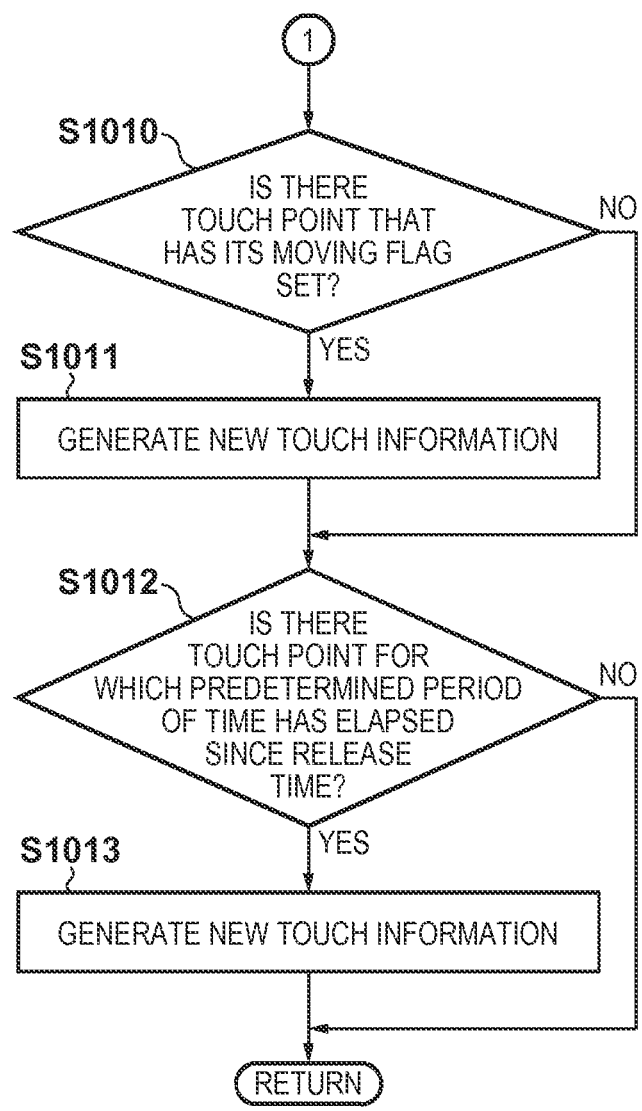

FIGS. 10A and 10B are flowcharts for describing processing associated with the timer interrupt of step S409 in FIG. 4.

First, in step S1001, the CPU 1101 determines whether or not, in the latest touch information, there is a touch point whose double tap flag and single tap flag both indicate "TRUE", and if there is such a touch point, the procedure advances to step S1002, and otherwise the procedure advances to step S1003. In step S1002, the CPU 1101 executes processing for transmitting a double tap event since the double tap flag of the touch point is set to on, and the procedure advances to step S1005. Here, if the double tap event has been generated, as illustrated in FIG. 5I, the coordinate values of the latest touch information are transmitted to the gestural event processing section 2200.

On the other hand, in step S1003, the CPU 1101 determines whether or not, in the latest touch information, there is a touch point whose single tap flag only is "TRUE", and if there is such a touch point, the procedure advances to the step S1004, and otherwise the procedure advances to step S1005. In step S1004, the CPU 1101 executes processing for transmitting a single tap event since the single tap flag of the touch point is set to on, and the procedure advances to step S1005. If the single tap event has been generated, as illustrated in FIG. 5J, the coordinate values of the latest touch information are transmitted to the gestural event processing section 2200.

In step S1005, the CPU 1101 determines whether or not, in the latest touch information, there is a touch point whose long tap flag is "TRUE", and if there is such a touch point, the procedure advances to step S1006, and otherwise the procedure advances to step S1007. In step S1006, the CPU 1101 executes processing for transmitting a long tap event since the long tap flag of the touch point is set to on, and the procedure advances to step S1007. If the long tap event has been generated, as illustrated in FIG. 5K, the coordinate values of the latest touch information are transmitted to the gestural event processing section 2200.

In step S1007, the CPU 1101 determines whether or not, in the latest touch information, there is a touch point for which a predetermined period of time or more has elapsed since the touch time, and if there is such a touch point, the procedure advances to step S1008, and otherwise the procedure advances to step S1010 (FIG. 10B). In step S1008, the CPU 1101 searches, with respect to the touch point of the latest touch information for which a predetermined period of time or more has elapsed since touch has been made, all touch points of the past touch information, and determines whether or not there is a touch point whose moving flag has been changed to "TRUE" among the latest and the past information. If there is such a touch point, the procedure advances to step S1010, and otherwise the procedure advances to step S1009. In step S1009, the CPU 1101 executes processing for transmitting a touch and hold event because the touch point has a moving flag that has not been set to on after a finger has touched the touch screen and has been held without moving for a predetermined period of time or more, and the procedure advances to step S1010. If the touch and hold event has been generated, as illustrated in FIG. 5L, the coordinate values of the latest touch information are transmitted to the gestural event processing section 2200.

In step S1010, the CPU 1101 determines whether or not there is a touch point whose moving flag has been set to on, and if there is such a touch point, the procedure advances to step S1011, and otherwise the procedure advances to step S1012. In step S1011, the CPU 1101 changes the touch information number and the time of touch input of the last touch information, and generates touch information in which moving flags are set to off for all the touch points, and the procedure advances to step S1012. For example, if the last touch information is the touch information P3 of FIG. 3C, the touch information P4 of FIG. 3D is newly generated with reference to the touch information P3. Specifically, in FIG. 3D, the touch information number is changed to "4", the time of touch input is changed to "3″050", and the moving flag is set to "FALSE". Here, the reason why the time of touch input shows "3″050" is that the timer interrupt is assumed to be generated at a 50 millisecond interval, for example.

Next, the procedure advances to step S1012, and the CPU 1101 determines whether or not there is a touch point for which a predetermined period of time has elapsed since the release time of the touch point, and if there is such a touch point, the procedure advances to step S1013, and otherwise, the processing associated with the timer interrupt ends. In step S1013, the CPU 1101 changes the touch information number of the last touch information, and generates touch information that excludes the touch point for which a predetermined period of time has elapsed since the release time. For example, if the last touch information is the touch information P6 of FIG. 3F, the touch information P7 of FIG. 3G is newly generated with reference to the touch information P6. Specifically, the touch information number is changed to "7", and the touch point 2 in FIG. 3F is deleted. With these procedures, the processing associated with the timer interrupt ends.

Next, an example of operations realized in the embodiment will be described with reference to FIGS. 11A and 11B.

Figure 11A:
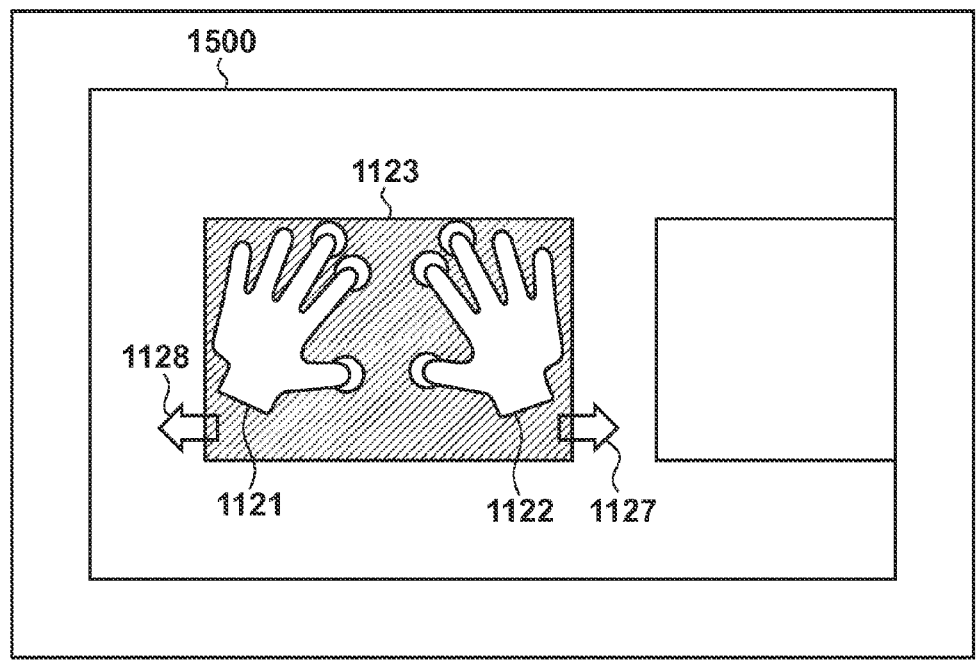
FIGS. 11A and 11B depict views illustrating division of a display object on a touch UI of the information processing apparatus using two hands.
Figure 11B:
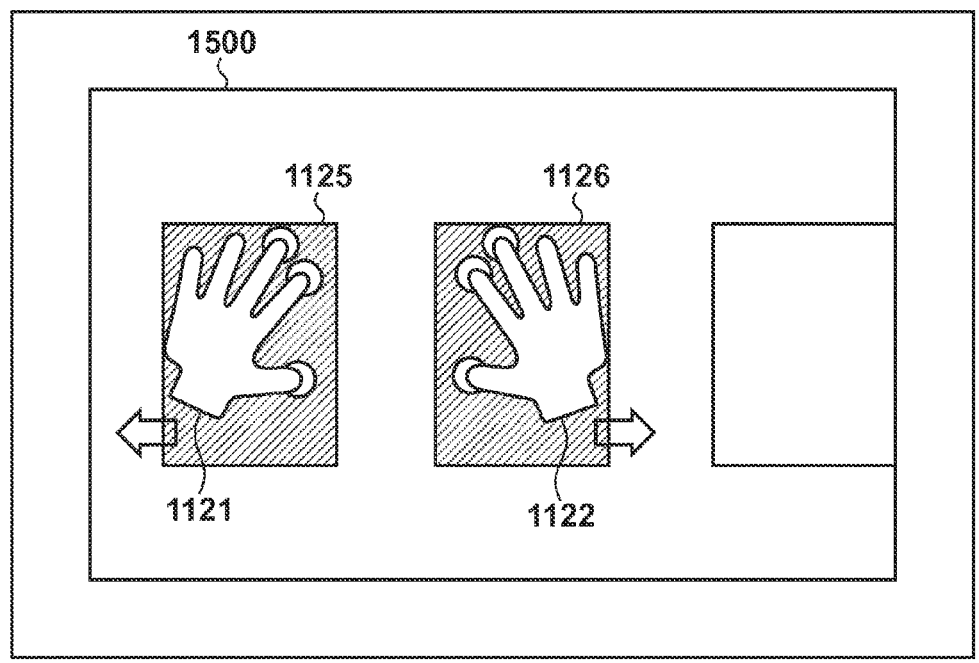

FIGS. 11A and 11B illustrate division of a display object 1123 on the touch UI 1500 of the information processing apparatus 1000 using two hands (a left hand 1121 and a right hand 1122). Note here that simply "object" refers to an entity of each page object of a document such as a PDF file, and "display object" refers to a preview image or the like of each page that is preview-displayed. However, the definition of an object is not particularly limited to this.

FIG. 11A illustrates a situation in which display objects including the display object 1123 are displayed on the touch UI 1500. Here, the two hands 1121 and 1122 touch the display object 1123 with three or more fingers of each hand (a total of six or more fingers), and respectively move in the directions of arrows 1128 and 1129. Thus, when the two hands 1121 and 1122 have moved a predetermined distance in opposite directions while remaining in contact with the touch panel, the display object 1123 is divided into two display objects 1125 and 1126, as illustrated in FIG. 11B.

Figure 12:
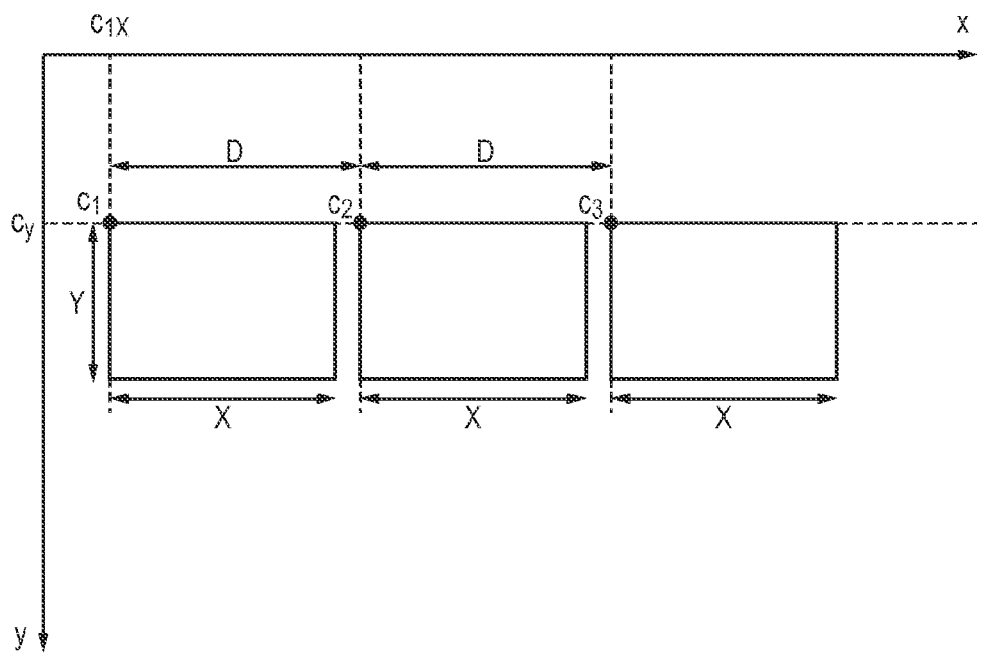
FIG. 12 depicts a view illustrating positions of display objects that are displayed on the touch UI in the embodiment.

FIG. 12 illustrates positions of display objects that are displayed on the touch UI 1500 in the embodiment. Here, the position of each display object is assumed to be the upper left vertex of a rectangle representing the display object. In FIG. 12, coordinates of the upper left point (x, y) on the touch UI 1500 are defined as (0, 0), and the horizontal axis indicates an x axis and a vertical axis indicates a y axis. Coordinates C1 to C3 show the positions of the respective display objects. Also, with respect to the size of each display object, X denotes the horizontal length thereof, Y denotes the vertical length thereof, and D denotes the distance between the positions of adjacent display objects.

Figure 13A:
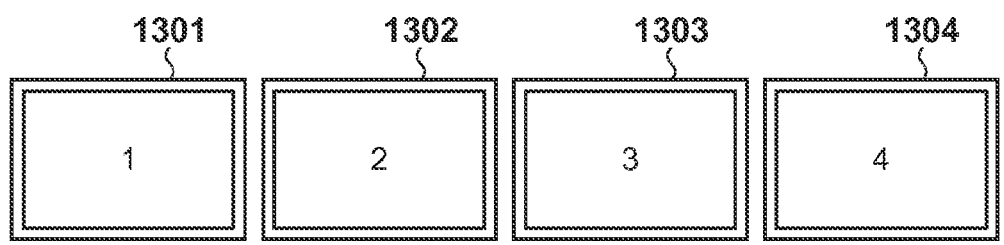
FIGS. 13A and 13B depict views illustrating situations in which images of objects are displayed in display objects in an aggregated manner.
Figure 13B:
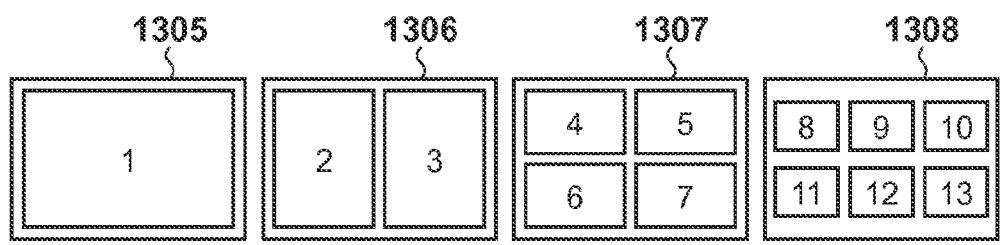

FIGS. 13A and 13B illustrate situations in which images of objects are displayed in display objects in an aggregated manner. Reference numerals 1301 to 1304 in FIG. 13A and reference numerals 1305 to 1308 in FIG. 13B respectively denote display objects.

FIG. 13A illustrates display objects that are set to so-called "1-in-1", in which an image of one object is displayed in one display object.

FIG. 13B illustrates a situation in which the display objects are set to different aggregation settings. A display object 1305 is set to 1-in-1 in which only an image of an object 1 is displayed. A display object 1306 is set to 2-in-1 in which images of objects 2 and 3 are displayed. Also, a display object 1307 is set to 4-in-1 in which images of objects 4 to 7 are displayed. Further, a display object 1308 is set to 6-in-1 in which images of objects 8 to 13 are displayed.

Figure 18:
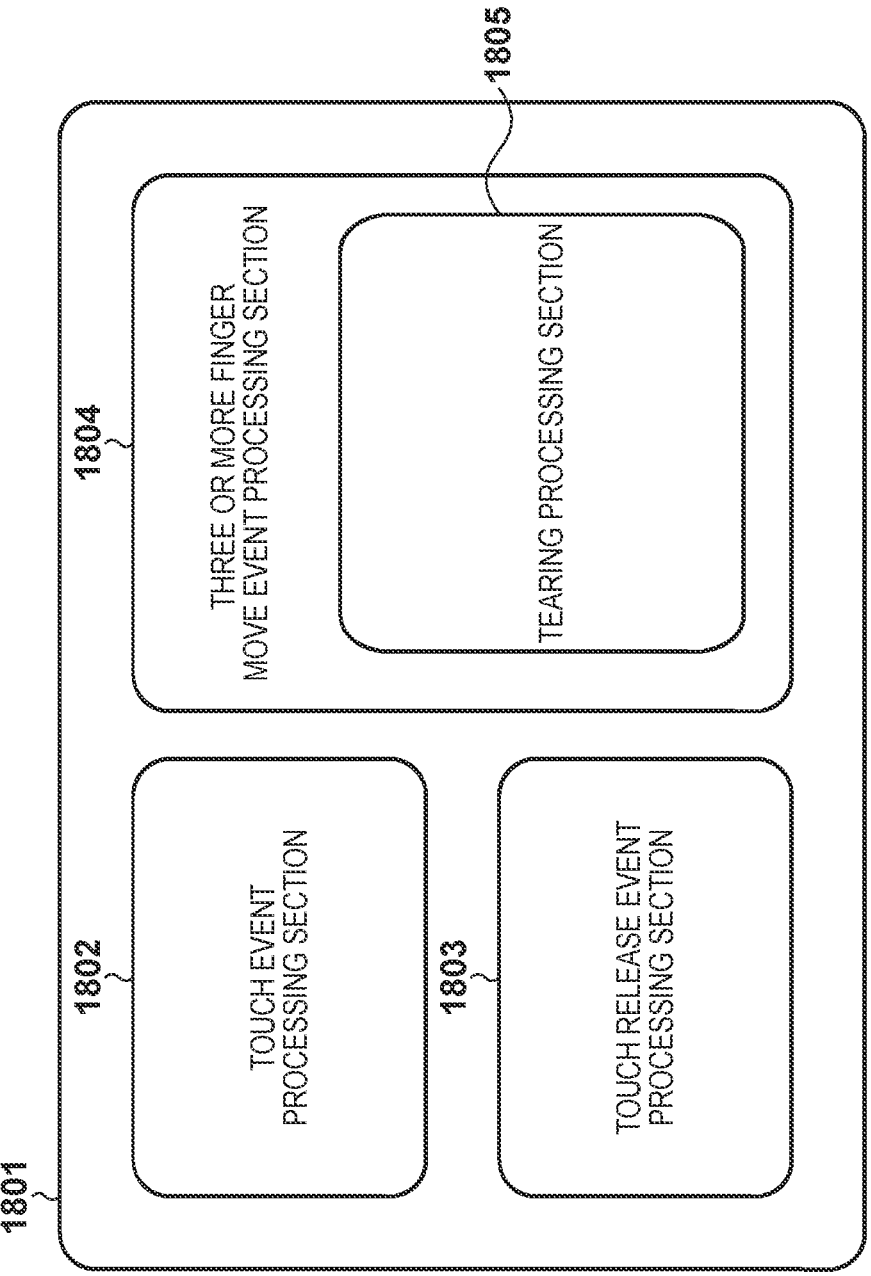
FIG. 18 is a block diagram illustrating a configuration of a division processing module that is software of the information processing apparatus according to the embodiment of the present invention.

FIG. 18 is a block diagram illustrating a configuration of a division processing module 1801 that is software of the information processing apparatus according to the present invention.

This division processing module 1801 is included in the gestural event processing section 2200 of FIG. 2, and executes processing with respect to the touch event (FIG. 5A), the touch release event (FIG. 5H), and the three or more finger move event (FIG. 5M).

A touch event processing section 1802 processes the touch event. A touch release event processing section 1803 processes the touch release event. A three or more finger move event processing section 1804 processes the three or more finger move event. A tearing processing section 1805 included in the three or more finger move event processing section 1804 executes processing for dividing a display object when, among the three or more finger move event, an operation using two hands as illustrated in FIG. 11B has been executed.

FIGS. 19A to 19D illustrate examples of tables that associate display objects with objects and manage various types of information on the display objects. These tables are data held in the RAM 1107, and can be read and written by the tearing processing section 1805. Also, defaults of the tables are generated by the division processing module 1801 when an application for executing tearing processing is started. The drawing section 2300 of FIG. 2 loads the information of the tables and executes drawing processing according to the information.

In FIGS. 19A to 19D, display object number is a number for uniquely specifying a display object to be displayed on the touch UI 1500. Object number is an ID of an object with which the object can uniquely be identified. Aggregation setting (horizontal, vertical) shows the numbers of allocated objects in each of the horizontal and vertical directions, the number of allocated objects being determined on the basis of how many objects are displayed for one display object number. For example, (1, 1) means one object in each of the horizontal and vertical directions, and thus indicates the 1-in-1 setting. Also, (3, 2) means three objects in the horizontal direction and two objects in the vertical direction, and thus indicates the 6-in-1 setting based on 3×2=6. Also, the numbers of the aggregation setting are calculated by the division processing module 1801 such that the horizontal length is always longer. Storage address shows an address in the RAM 1107 where each object is stored. Rectangular coordinates are coordinates of the position on the touch UI 1500 at which the upper left corner of a rectangle showing the corresponding display object is located. Selection flag is a flag that indicates whether or not the corresponding object is selected, with the selection flag being "TRUE" when the object is selected and otherwise is "FALSE". At the end of the object information, "ENDOBJ", which indicates the end of the object information, is stored in the object number. Also, in this case, all values such as addresses and the like are set to "NULL".

The drawing section 2300 loads the object information and displays preview images of the objects in respective rectangular regions. In this case, objects that have the same display object numbers are displayed in one display object in an aggregated manner. At this time, the numbers of objects in the horizontal and vertical directions are determined with reference to the aggregation setting. An object whose selection flag is set to on is displayed as being selected (for example, with a highlighted color).

As an example, FIG. 19A illustrates object information in which, as illustrated in FIG. 13B, objects are set to 1-in-1, 2-in-1, 4-in-1, and 6-in-1 in the order from the object with the object number "1".

Figure 14A:
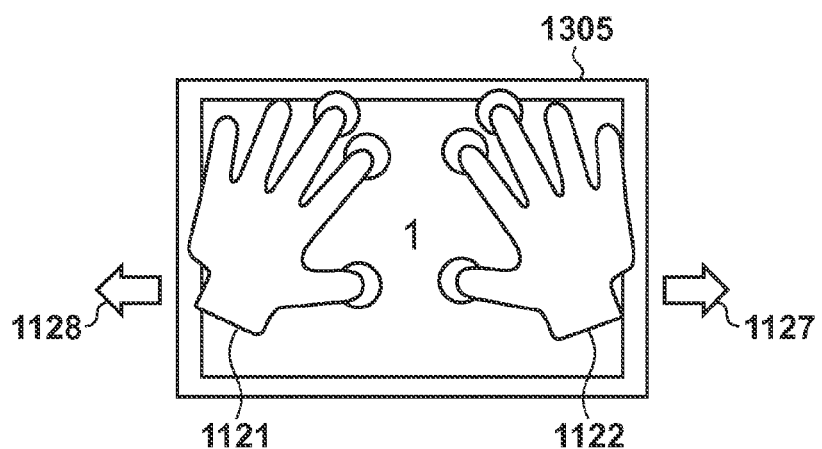
FIGS. 14A and 14B depict views illustrating division of a display object 1305 in FIG. 13B is divided into two display objects.
Figure 14B:
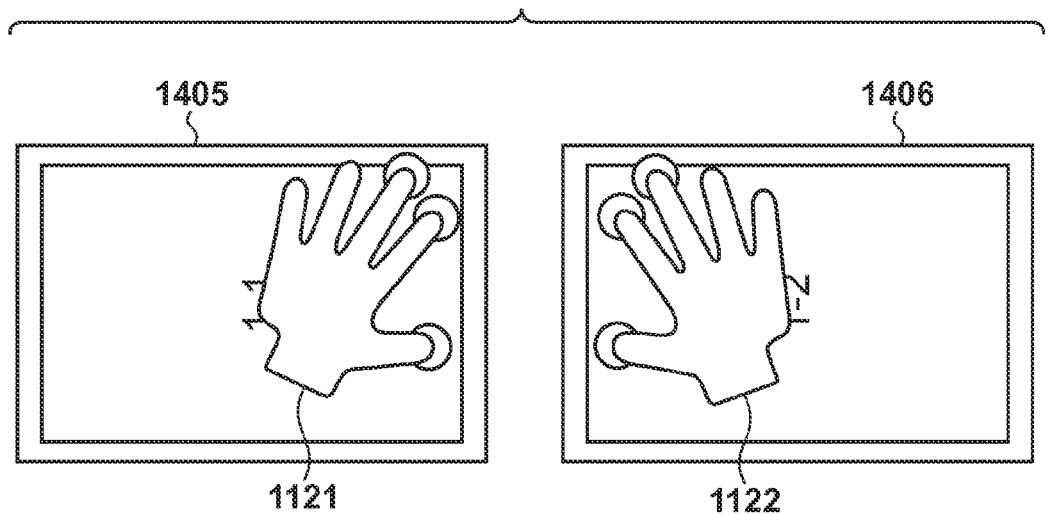

FIGS. 14A and 14B illustrate division of the display object 1305 in FIG. 13B into two display objects 1405 and 1406. Note that the same reference numerals are given to the elements common to FIG. 11A.

FIG. 14A illustrates a state in which the two hands 1121 and 1122 are touching the display object 1305, and FIG. 14B illustrates a state in which, by the right and left hands respectively moving in the directions of the arrows 1127 and 1128, the display object 1305 is divided into two display objects 1405 and 1406.

The changes in the object information at this time are shown by the changes between FIG. 19A and FIG. 19B (the changed parts are indicated by shaded regions in FIG. 19B). The contents of the changes at this time will be described later in detail.

Also, in the present embodiment, even after the display object has been divided, such as the change from FIG. 14A to FIG. 14B, the divided display objects 1405 and 1406 (1-1 and 1-2) have in common a landscape display format having a long horizontal length. Therefore, in the present embodiment, display is performed such that each divided portrait object having a long vertical length is rotated 90 degrees in the left direction, and the vertical length is enlarged so as to be aligned with the length of the display object 1305. However, it is not necessarily needed to conform to this method, and the divided portrait objects may be displayed without being rotated or enlarged.

Also, FIGS. 15A and 15B illustrate division of the display object 1306 in FIG. 13B into display objects 1505 and 1506. Note that the same reference numerals are given to the elements common to FIG. 11A. The changes in the object information at this time are shown by the changes between FIG. 19A and FIG. 19C (the changed parts are indicated by shaded regions in FIG. 19C). The contents of the changes at this time will be described later in detail with reference to FIG. 22.

Also, FIGS. 16A to 16C illustrate division of the display object 1307 in FIG. 13B into display objects 1605 and 1606. FIG. 16A illustrates the display object 1307 in which the objects are arranged 4-in-1, and FIG. 16B illustrates a state in which the display object 1307 has been divided into the display objects 1605 and 1606 as illustrated in FIG. 11B. In FIG. 16C, as explained with reference to FIG. 14B, the display objects have in common a landscape display format also after the division of the display object 1307. Therefore, display is performed such that the divided portrait objects 1605 and 1606 each having a long vertical length are rotated 90 degrees in the left direction, and the display objects 1605 and 1606 are enlarged so that the sizes thereof match the original size of the display object 1307. The changes in the object information at this time are shown by the changes between FIG. 19A and FIG. 19D (the changed parts are indicated by shaded parts in FIG. 19D). The contents of the changes at this time will be described later in detail with reference to FIG. 22. Note that the change in display from FIG. 16B to FIG. 16C may be made by, for example, an operator releasing his or her fingers from the touch UI 1500.

Figure 17A:
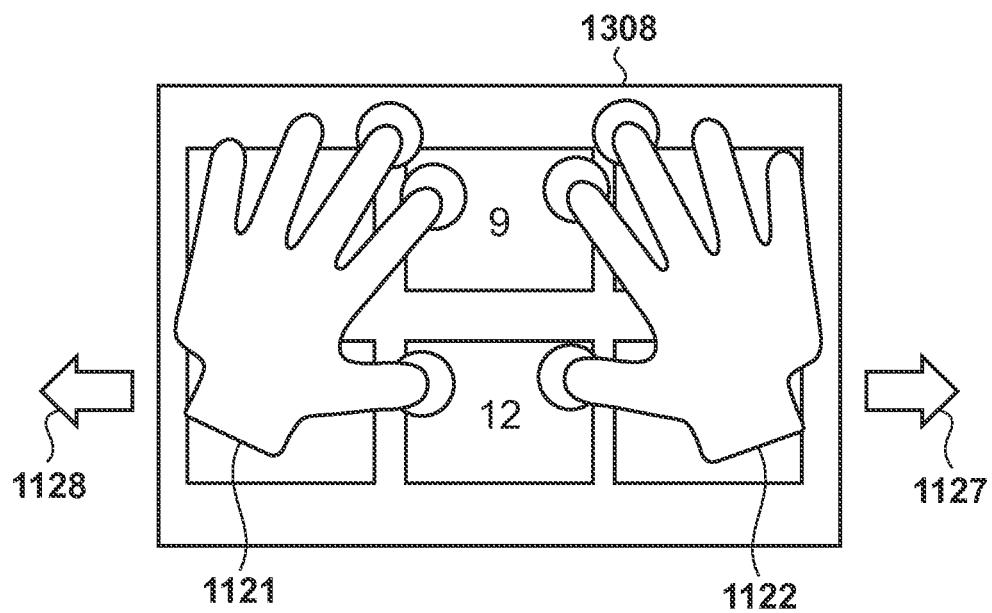
FIGS. 17A and 17B are diagrams illustrating a situation in which a user attempt to divide a display object 1308 in FIG. 13B with two hands but cannot divide the display object.
Figure 17B:
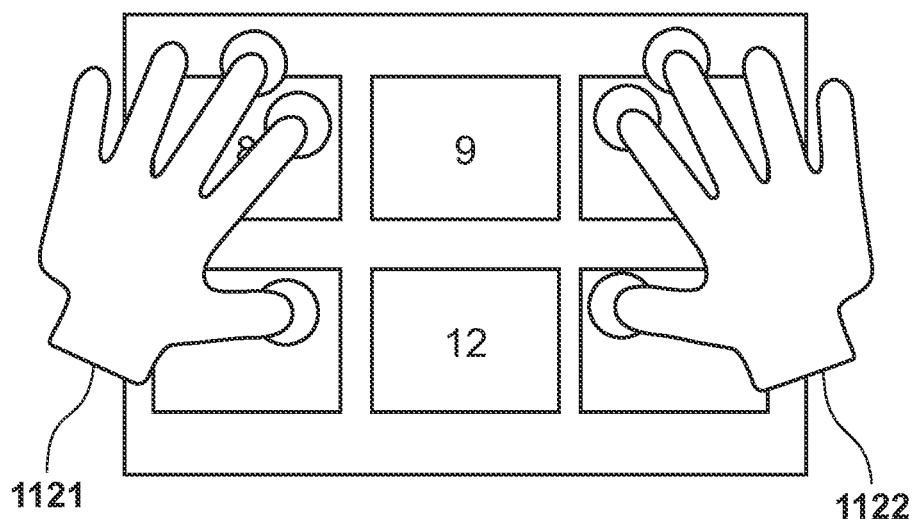

Further, FIGS. 17A and 17B are diagrams illustrating that a user attempt to divide the display object 1308 in FIG. 13B with two hands but cannot divide the display object. This is intended to prevent the display object from being divided in the middle because the number of objects in the horizontal direction is three.

In the present embodiment, the division processing is hereinafter likewise prohibited when the number of objects to be arranged and displayed in the horizontal direction within the display object is an odd number other than 1, but the present embodiment is not limited to this. A display object may be divided into two at a position other than the middle, such as an intermediate portion between objects, or at all portions that can be divided. In this case, the object information is not changed.

Hereinafter, the detailed operations for dividing a display object according to the present embodiment will be described with reference to FIGS. 14A to 17B and FIGS. 20 to 22. Note that, in the present embodiment, this processing is realized by software of the information processing apparatus 1000, but may be realized by hardware modules.

Figure 20:
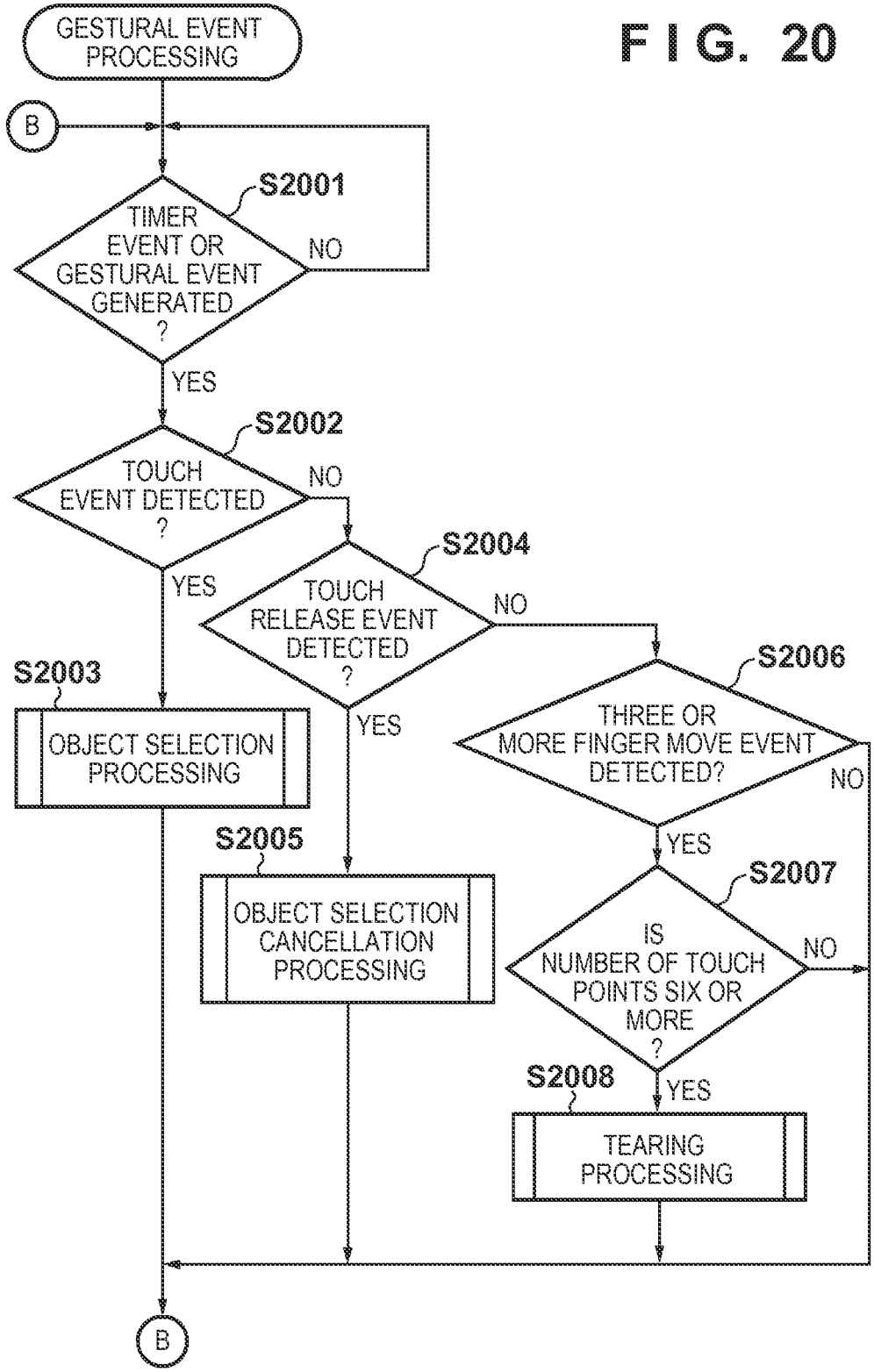
FIG. 20 is a flowchart for describing a flow of processing performed by the division processing module of the information processing apparatus according to the present embodiment.

FIG. 20 is a flowchart for describing the flow of processing performed by the division processing module 1801 of the information processing apparatus according to the present embodiment. A program for executing this processing is stored in the ROM 1106, and the processing is realized by the CPU 1101 executing this program.

First, in step S2001, the CPU 1101 checks whether or not a timer event or a gestural event has been received. Timer event refers to an event generated by an OS periodically at a predetermined time interval. If a timer event or a gestural event has been received, the procedure advances to step S2002, and if a timer event or a gestural event has not been received, the procedure returns to step S2001 to check again whether or not an event has been received.

Figure 21A:
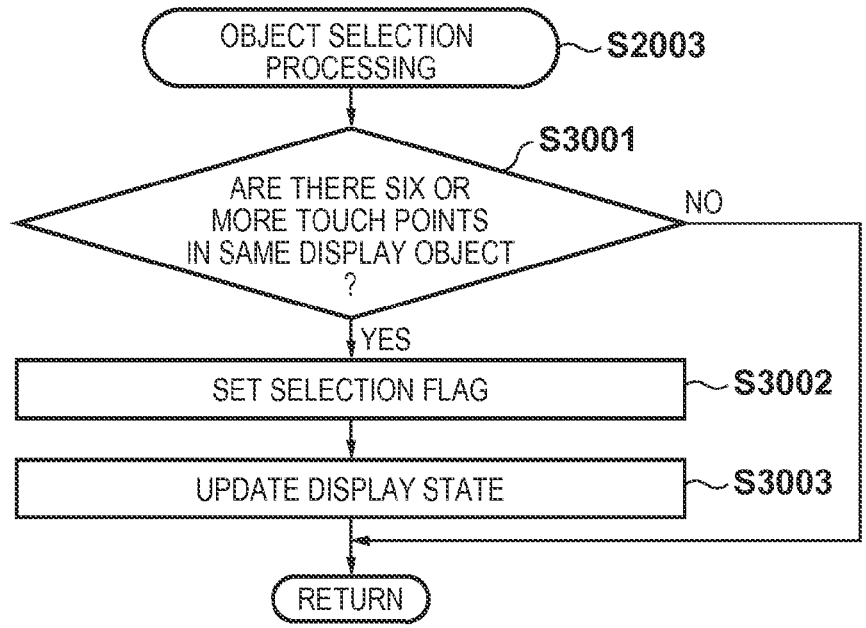
FIG. 21A is a flowchart for describing object selection processing in step S2003 in FIG. 20.

In step S2002, the CPU 1101 determines whether or not the detected event is a touch event. If the detected event is determined to be a touch event, the procedure advances to step S2003, and otherwise the procedure advances to step S2004. In step S2003, the CPU 1101 executes object selection processing. This processing is performed by the touch event processing section 1802 of the division processing module 1801. The flowchart of the object selection processing is illustrated in FIG. 21A, and a description thereof will be given later. When step S2003 ends, the procedure returns to step S2001.

Figure 21B:
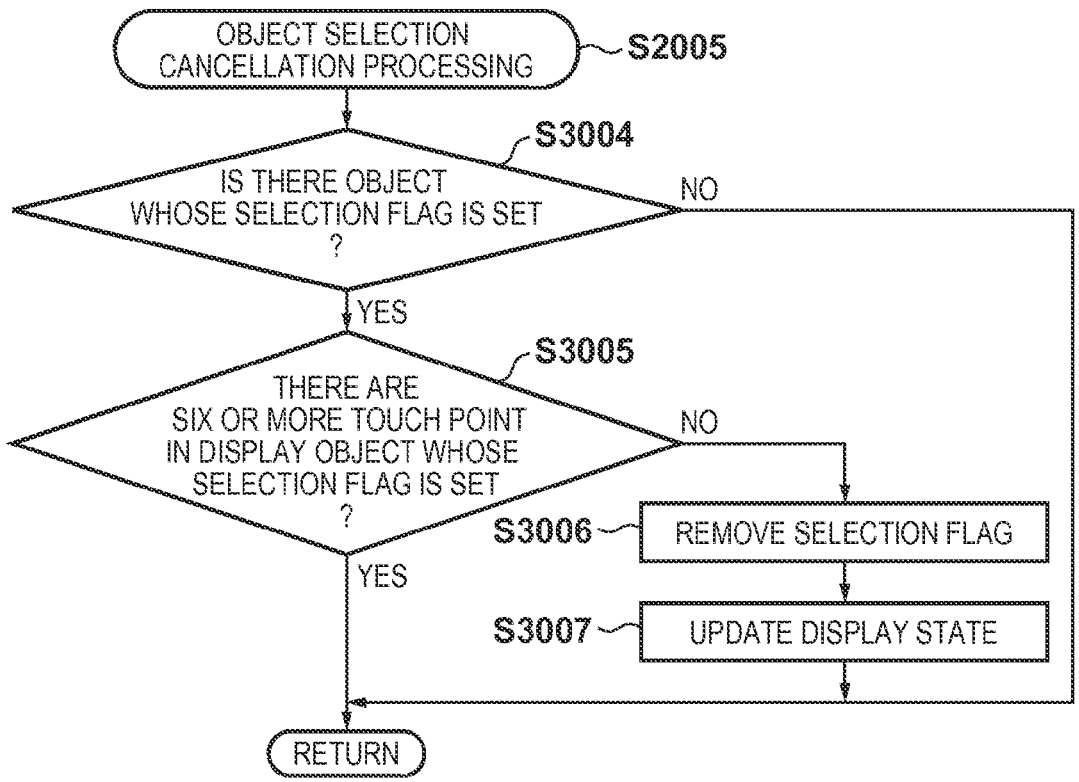
FIG. 21B is a flowchart for describing object selection cancellation in step S2005 in FIG. 20.

If the detected event is determined not to be a touch event in step S2002, the procedure advances to step S2004, in which the CPU 1101 determines whether or not the event detected in step S2001 is a touch release event. If the event is determined to be a touch release event, the procedure advances to step S2005, and otherwise the procedure advances to step S2006. In step S2005, the CPU 1101 executes object selection cancellation processing. This processing is performed by the touch release event processing section 1803 of the division processing module 1801. This processing is illustrated in the flowchart of FIG. 21B, and a description thereof will be given later. When step S2005 thus ends, the procedure returns to step S2001.

Figure 22:
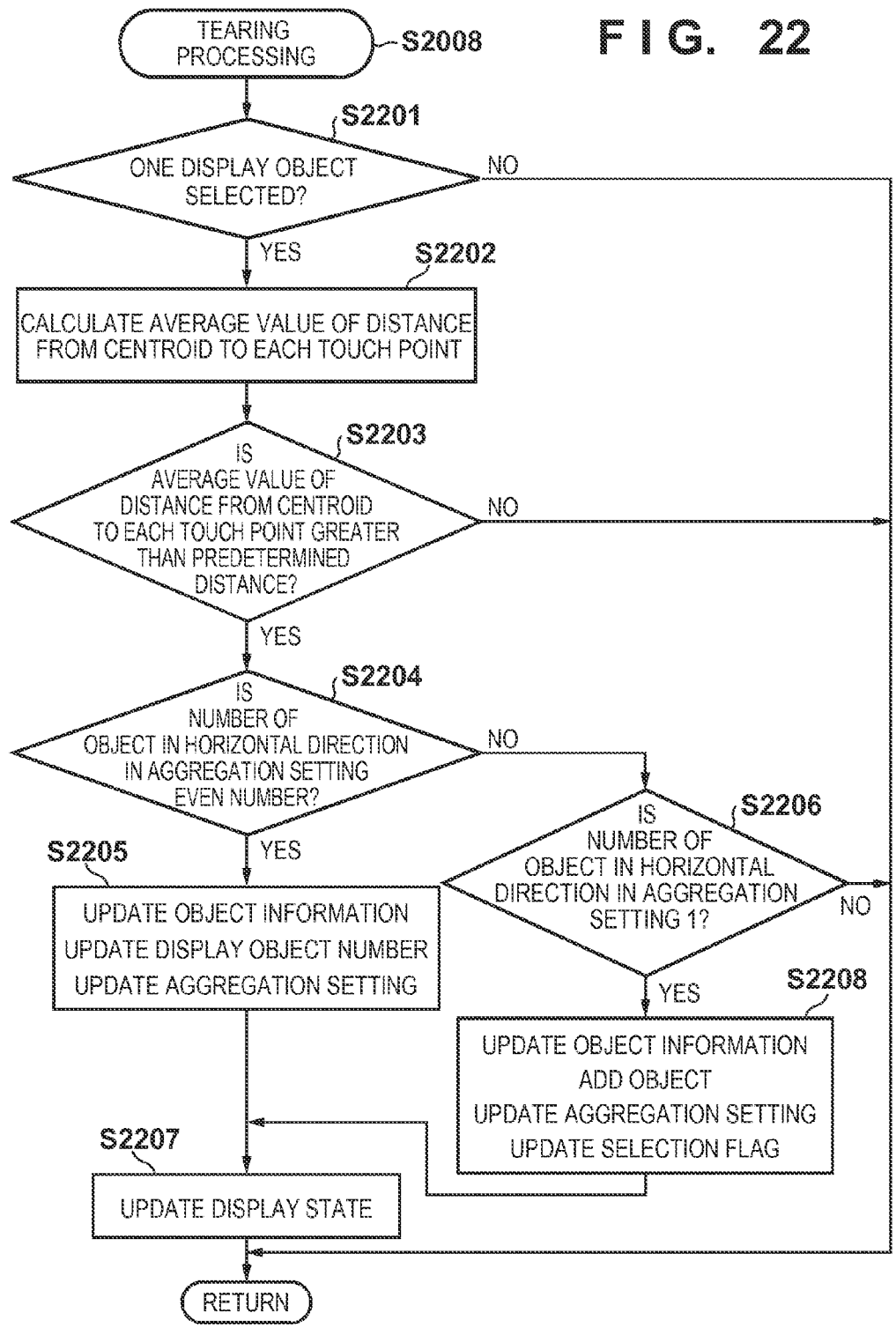
FIG. 22 is a flowchart for describing tearing processing performed by the information processing apparatus according to the present embodiment.

Also, in step S2006, the CPU 1101 determines whether or not the detected event is a three or more finger move event. If the detected event is determined to be a three or more finger move event, the procedure advances to step S2007, and otherwise the procedure returns to step S2001 to wait to receive an event. In step S2007, the CPU 1101 determines based on information included in the three or more finger move event whether or not the number of touch points is six or more. If the number of touch points is six or more, the procedure advances to step S2008, and otherwise the procedure returns to step S2001 to wait to receive an event. In step S2008, the CPU 1101 executes display object tearing processing. This processing is executed by the tearing processing section 1805 included in the three or more finger move event processing section 1804 of the division processing module 1801. The flowchart of this processing is illustrated in FIG. 22, and a description thereof will be given later. When the processing in step S2008 thus ends, the procedure returns to step S2001.

By repeatedly executing the above-described procedures, it is possible to process events that are necessary for the present embodiment among the events transmitted by the gestural event generation section 2100.

FIG. 21A is a flowchart for describing the object selection processing in step S2003 of FIG. 20 executed in the information processing apparatus according to the present embodiment. This flowchart corresponds to the processing performed by the touch event processing section 1802.

First, in step S3001, the CPU 1101 checks, with respect to each set of the rectangular coordinates, whether or not there are six or more touch points in an object display region. Object display region refers to a rectangular region whose upper left vertex is located at the above-mentioned rectangular coordinates and that has a horizontal length X and a vertical length Y. Touch point refers to the latest touch point that can be obtained as additional information of the touch event. If there are six or more touch points, the procedure advances to step S3002, in which the CPU 1101 sets the selection flag of the object information of an object that includes three or more touch points within the display region to "TRUE". Then, the procedure advances to step S3003 to update the display state in this display object, and the processing ends. Note that if in step S3001 there are not six or more touch points, this processing ends.

FIG. 21B is a flowchart for describing the object selection cancellation in step S2005 of FIG. 20. This flowchart corresponds to the processing performed by the touch release event processing section 1803.

First, in step S3004, the CPU 1101 checks whether or not there is an object whose selection flag is "TRUE" among all the objects. If there is such an object, the procedure advances to step S3005, and if there is not such an object, the procedure ends. In step S3005, the CPU 1101 checks, with respect to each object whose selection flag was set (to "TRUE") in step S3004, whether or not there are six or more touch points in a rectangle region whose vertex is at the rectangle coordinates. If all the objects whose selection flags are set to on include six or more touch points, the procedure ends. On the other hand, if the objects whose selection flags are set to on include at least one object in which there are not six or more touch points, the procedure advances to step S3006. In step S3006, the CPU 1101 sets the selection flag of an object that does not include three or more touch points in the rectangle region thereof to "FALSE", that is, the CPU 1101 sets the object to be unselected. Then, the procedure advances to step S3007, and the CPU 1101 requests the drawing section 2300 to update the display image.

FIG. 22 is a flowchart for describing the tearing processing performed by the information processing apparatus 1000 according to the present embodiment. This processing is the processing in step S2008 of FIG. 20, and corresponds to the processing performed by the tearing processing section 1805. A program for executing this processing is stored in the ROM 1106, and the processing is realized by the CPU 1101 executing this program. This processing describes in detail the procedures, as illustrated in FIG. 11B, for dividing the display object 1123 with two hands 1121 and 1122 in a manner of tearing the display object.

First, in step S2201, the CPU 1101 determines whether or not one display object is selected. This determination may be made by determining, for example, whether or not display objects of only one type in the object information illustrated in FIGS. 19A to 19D have selection flag columns indicating "TRUE". If only one display object is selected, the procedure advances to step S2202, and otherwise the procedure ends. In step S2202, the CPU 1101 calculates an average value of distances from the latest centroid coordinates to each latest touch point. The latest touch point and the latest coordinates of the centroid can be obtained from the three or more finger move event.

Assuming here that at the current point in time t, the coordinates of the latest touch points are denoted by Fi(t) (where i is a value from 1 to N, and N denotes the number of latest touch points) and the coordinates of the latest centroid that are calculated from these coordinates of the latest touch points are denoted by G(t), the average value av(t) of the distances from the latest centroid to each touch point is expressed by the following equation.

$$av(t) = \sum_{i=1}^{i=N} (|Fi(t) - G(t)|)/N \qquad (1)$$

where |Fi(t)−G(t)| indicates the distance between two points.

Then, the procedure advances to step S2203, and the CPU 1101 determines whether or not the average value of the distances from the latest centroid to each touch point that is obtained by equation (1) is greater than a predetermined distance. If the average value is greater than the predetermined distance, the procedure advances to step S2204, and if the average value is equal to or less than the predetermined distance, the procedure ends. This is to determine whether or not the operator is touching the display object while spreading the fingers of his or her two hands, as illustrated in FIGS. 11A, 11B, 15A, and 15B, and if the operator is doing so, it is determined that the operator is trying to execute the tearing processing of the present embodiment, and otherwise it is determined that the processing that the operator is trying to execute is not the tearing processing.

In step S2204, the CPU 1101 checks the object information, and determines whether or not the object whose selection flag is set to on has an aggregation setting (horizontal, vertical) in which the number of objects in the horizontal direction is an even number. This is to decide whether or not to execute the division processing depending on the number of objects to be aggregated in the horizontal direction in the display object. If the number of objects in the horizontal direction is an even number, the procedure advances to step S2205, and if the number of the objects in the horizontal direction is an odd number, the procedure advances to step S2206. In step S2205, the CPU 1101 updates the object information. At this time, different display object numbers are given to the upper half and the lower half of the selected display objects. Then, the procedure advances to step S2207, and the CPU 1101 requests the drawing section 2300 to update the display image.

For example, as described above, if the processing until this step is executed with respect to the display object 1306 as illustrated in FIG. 15A, which is set to 2-in-1, the object information is changed from FIG. 19A to FIG. 19C. In this case, the display object number 2 in FIG. 19A is changed to respectively different display object numbers 2-1 and 2-1 in FIG. 19C. Also, the aggregation setting is changed from (2, 1) in FIG. 19A to (1, 1), and the rectangle coordinates are changed from C2 to C2-1 and C2-2.

Also, if the processing until this step is executed with respect to the display object 1307 as illustrated in FIG. 16A, which is set to 4-in-1, the display object will be as illustrated in FIG. 16C, and the object information is changed from FIG. 19A to FIG. 19D. In this case, the display object numbers of the object numbers 4 to 7 that are all "3" in FIG. 19A are changed such that the upper half of the objects, that is, the object numbers 4 and 5 have the display object numbers "3-1", and the lower half of the objects, that is, the object numbers 6 and 7 have the display object numbers "3-2". Also, the aggregation setting is changed from (2, 2) in FIG. 19A to (2, 1), and the rectangle coordinates are also changed from C3 to C3-1 and C3-2. Note here that the reason why the aggregation setting is (2, 1) instead of (1, 2) is, as described above, to display the objects in a landscape format.

Also, the change in the order of allocation is particularly noteworthy. As illustrated in FIG. 16A, the order of allocation in the case of 4-in-1 in the present embodiment has a configuration in which the numbers of 4, 5, 6, and 7 are arranged in the order of the upper left, the upper right, the lower left, and the lower right (Z order). However, when the objects are divided into right and left, the numbers are allocated to the divided display objects in the discontinuous object order of 4, 6, 5, and 7. It is here achieved that, as illustrated in FIG. 16B, the numbers are allocated to the divided display objects 1605 and 1606 in the continuous object order from 4 to 5, and from 6 to 7. This can be realized only by displaying display object numbers and object numbers managed in the object information in accordance with the allocation rule such as the Z order that is managed by the drawing section 2300.

On the other hand, in step S2206, the CPU 1101 checks the object information to determine whether or not the selected display objects have an aggregation setting in which the number of objects in the horizontal direction is "1". If the number of objects in the horizontal direction is "1", the procedure advances to step S2208, and if the number of objects in the horizontal direction is an odd number other than "1", the procedure ends. Examples of the case where the number of objects in the horizontal direction is an odd number other than "1" include the above-described case in FIGS. 17A and 17B, and corresponds to the case of the display object 4 in FIG. 19A. In step S2208, the CPU 1101 divides one display object into two display objects, as illustrated for example in the above-described FIG. 14B, and updates the object information. At this time, a new display object row is added immediately below the selected display object.

As described above, if the processing until this step is executed on the display object 1305 which is set to 1-in-1, as shown in FIG. 14A, the object information is changed from FIG. 19A to FIG. 19B. In this case, the display object number is changed from "1" in FIG. 19A to different display object numbers of "1-1" and "1-2" in FIG. 19B. Also, aggregation settings are newly generated and both set as (1, 1), and the rectangle coordinates are changed from C1 to C1-1 and C1-2. Then, the procedure advances to step S2207, and the CPU 1101 requests the drawing section 2300 to change the display image based on the object information.

By repeatedly executing the above-described procedures, it is possible to divide a display object through operations on the UI 1500 in such a manner of tearing paper with two hands.

Also, objects to be arranged in each divided display object are decided according to attributes of the objects in an original display object, such as for example the order of the objects having an aggregation setting. Accordingly, if a display object that is constituted by objects each having an aggregation setting, for example, is divided into two display objects, the objects included in each divided display object can have, for example, continuous page numbers. Also, the objects included in the each divided display object can be correlated with each other.

According to the present embodiment, it is possible to divide a display object into two display objects by an operation of touching the display object with two hands and dividing the display object, and to decide an object included in each divided display object. Therefore, the display object for which, for example, an aggregation setting such as 2-in-1 is configured can be divided into two display objects and display objects that are each set to 1-in-1 can be generated.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-178922, filed Aug. 10, 2012, which is hereby incorporated by reference herein in its entirety.

The invention claimed is:

1. An information processing apparatus provided with a display unit including a touch panel, the information processing apparatus comprising:
   a detection unit that detects a plurality of touch points being touched at a time on the touch panel;
   a division unit that divides, if a number of the plurality of touch points detected by the detection unit is a predetermined number or more, a plurality of display objects into two groups of display objects according to one of the plurality of touch points moving in an opposite direction on the touch panel to another of the plurality of touch points;
   a decision unit that decides one or more objects that are to be displayed in each of the two groups of display objects obtained by the division unit, according to an attribute, including an aggregation setting in which the plurality of display objects are constituted by a plurality of objects, of an object that is included in each of the plurality of display objects before the division; and
   a determination unit that determines, if the plurality of display objects before the division have the aggregation setting of a plurality of objects, whether or not to execute the division of the plurality of display objects by the division unit, on the basis of a number of display objects in the horizontal direction that are arranged in the plurality of display objects,
   wherein one of the two groups of display objects includes the one of the plurality of touch points and another of the two groups of display objects includes the another of the plurality of touch points.

2. The information processing apparatus according to claim 1,
   wherein the determination unit determines to execute the division of the plurality of display objects by the division unit if the number of the display objects in the horizontal direction that are arranged in the plurality of display objects is an even number.

3. The information processing apparatus according to claim 1,
   wherein the determination unit determines not to execute the division of plurality of the display objects by the division unit if the number of the display objects in the horizontal direction that are arranged in the plurality of display objects is an odd number other than 1.

4. The information processing apparatus according to claim 1,
   wherein if the object corresponds to one page of a document, each group of display objects obtained by the division unit includes at least one object of continuous pages.

5. The information processing apparatus according to claim 1,
   wherein each group of the display objects obtained by the division unit is displayed as an object in a landscape format.

6. The information processing apparatus according to claim 1, wherein the object corresponds to a page of a document, and the aggregation setting sets a layout for printing of the document.

7. The information processing apparatus according to claim 1, wherein if the object corresponds to a page of a document and the aggregation setting sets 2-in-1, an object displayed on one group of display objects is one page and an object displayed on another group of display objects is a next or previous page of the one page.

8. The information processing apparatus according to claim 1, wherein if the object corresponds to a page of a document and the aggregation setting sets 4-in-1, objects displayed on each group of display objects after the division are two continuous pages of the document.

9. The information processing apparatus according to claim 1, wherein the object corresponds to a page of a document, and if each group of the display objects after the division includes plural objects, an order of objects corresponding to the display objects before the division is changed into a continuous order of objects in each group of the display objects after the division.

10. A method for controlling an information processing apparatus provided with a display unit including a touch panel, the method comprising:
   detecting a plurality of touch points being touched at a time on the touch panel; and
   dividing, if a number of the plurality of touch points detected in the detecting is a predetermined number or more, a plurality of display objects into two groups of display objects according to one of the plurality of touch points moving in an opposite direction on the touch panel to another of the plurality of touch points;
   deciding one or more objects that are to be displayed in each of the two groups of display objects obtained in the dividing, according to an attribute, including an aggregation setting in which the plurality of display objects are constituted by a plurality of objects, of an object that is included in each of the plurality of display object before the division; and
   determining, if the display objects before the division have the aggregation of a plurality of objects, whether or not to execute the division of the display objects in the dividing, on the basis of a number of objects in the horizontal direction that are arranged in the display objects, wherein one of the two groups of display objects includes the one of the plurality of touch points and another of the two groups of display objects includes the another of the plurality of touch points.

11. The method according to claim 10, wherein it is determined to execute the division of the plurality of display objects in the dividing if the number of the display objects in the horizontal direction that are arranged in the plurality of display objects is an even number.

12. The method according to claim 10, wherein it is determined not to execute the division of the plurality of display objects in the dividing if the number of the display objects in the horizontal direction that are arranged in the plurality of display objects is an odd number other than 1.

13. The method according to claim 10, wherein the predetermined number is 6.

14. The method according to claim 10, wherein if the object corresponds to one page of a document, each group of display objects obtained in the dividing includes at least one object of continuous pages.

15. The method according to claim 10, wherein each group of display objects obtained in the dividing is displayed as an object in a landscape format.

16. A non-transitory computer-readable storage medium storing a program for causing a computer to function as an information processing apparatus provided with a display unit including a touch panel, the information processing apparatus comprising:

a detection unit that detects a plurality of touch points being touched at a time on the touch panel;

a division unit that divides, if a number of the plurality of touch points detected by the detection unit is a predetermined number or more, a plurality of display objects into two groups of display objects according to one of the plurality of touch points moving in an opposite direction on the touch panel to another of the plurality of touch points;

a decision unit that decides one or more objects that are to be displayed in each of the two groups of display objects obtained by the division unit, according to an attribute, including an aggregation setting in which the plurality of display objects are constituted by a plurality of objects, of an object that is included in each of the plurality of display object before the division; and a determination unit that determines, if the plurality of display objects before the division have the aggregation setting of a plurality of objects, whether or not to execute the division of the plurality of display objects by the division unit, on the basis of a number of display objects in the horizontal direction that are arranged in the plurality of display objects, wherein one of the two groups of display objects includes the one of the plurality of touch points and another of the two groups of display objects includes the another of the plurality of touch points.

* * * * *